(12) United States Patent
Fludger et al.

(10) Patent No.: US 12,047,163 B2
(45) Date of Patent: Jul. 23, 2024

(54) OUT-OF-BAND COMMUNICATION CHANNEL FOR POINT-TO-MULTI-POINT COMMUNICATIONS

(71) Applicant: Infinera Corporation, San Jose, CA (US)

(72) Inventors: Christopher Fludger, Nurenberg (DE); Syed Muhammad Bilal, Nurenberg (DE); Demin Yao, Ottawa (CA); Xiang Chen, Ottawa (CA); Han Henry Sun, Ottawa (CA); Byungyoon Min, Sunnyvale, CA (US); William Isaac, Ottawa (CA); Zihao Liu, Sunnyvale, CA (US); Yuanqing Li, Sunnyvlae, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/527,137

(22) Filed: Nov. 15, 2021

(65) Prior Publication Data

US 2022/0158750 A1    May 19, 2022

Related U.S. Application Data

(60) Provisional application No. 63/113,973, filed on Nov. 15, 2020.

(51) Int. Cl.
*H04J 14/02* (2006.01)
*H04B 10/50* (2013.01)
*H04B 10/54* (2013.01)

(52) U.S. Cl.
CPC ........ *H04J 14/0257* (2013.01); *H04B 10/504* (2013.01); *H04B 10/54* (2013.01); *H04J 14/0272* (2013.01)

(58) Field of Classification Search
None
See application file for complete search history.

(56) References Cited

U.S. PATENT DOCUMENTS

| | | | |
|---|---|---|---|
| 7,949,254 B1 * | 5/2011 | Stevens | H04J 14/005 398/40 |
| 2014/0072303 A1 * | 3/2014 | Pfau | H04B 10/516 398/79 |
| 2014/0079391 A1 * | 3/2014 | Kim | H04B 10/532 398/30 |

OTHER PUBLICATIONS

Lu et al., "Optical subcarrier processing for Nyquist SCM signals via coherent spectrum overlapping in four-wave mixing with coherent multi-tone pump", Jan. 16, 2018, Optics Express, vol. 26, No. 2, pp. 1488-1496 (Year: 2018).*

* cited by examiner

*Primary Examiner* — David W Lambert
(74) *Attorney, Agent, or Firm* — David L. Soltz

(57) ABSTRACT

Techniques are described for implementing an out-of-band communication channel used to exchange control channel information in sub-carrier-based optical communication systems. In an example implementation, a transmitter includes a laser operable to supply an optical signal, a digital signal processor operable to supply first electrical signals based on first data input to the digital signal processor and second data input to the digital signal processor, digital-to-analog conversion circuitry operable to output second electrical signals based on the first electrical signals, modulator driver circuitry is operable to output third electrical signals based on the second electrical signals, and an optical modulator operable to supply first and second modulated optical signals based on the third electrical signals. The first modulated optical signal includes a plurality of optical subcarriers carrying user data. The plurality of optical subcarriers also being amplitude modulated to carry control information.

16 Claims, 21 Drawing Sheets

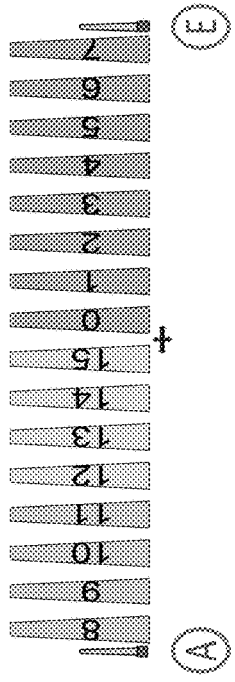
Fig. 7a  Standard 400G Hub — Leaf aligns to A/E
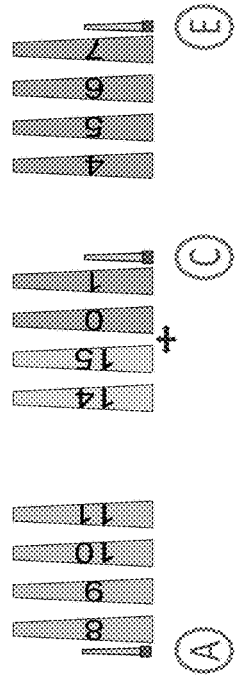
Fig. 7b  400G Hub with 12 channels — Leaf aligns to A/C/E
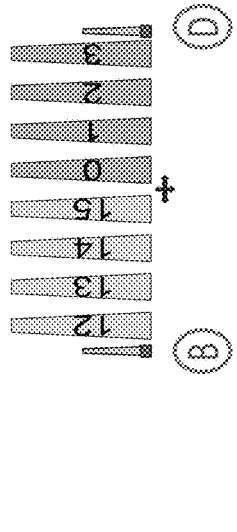
Fig. 7c  200G Hub — Leaf aligns to B/D
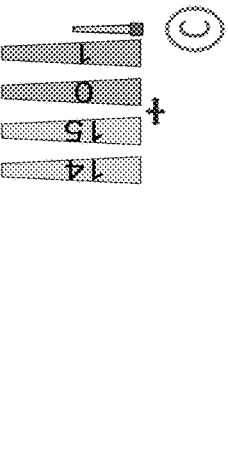
Fig. 7d  100G Hub — Leaf aligns to C

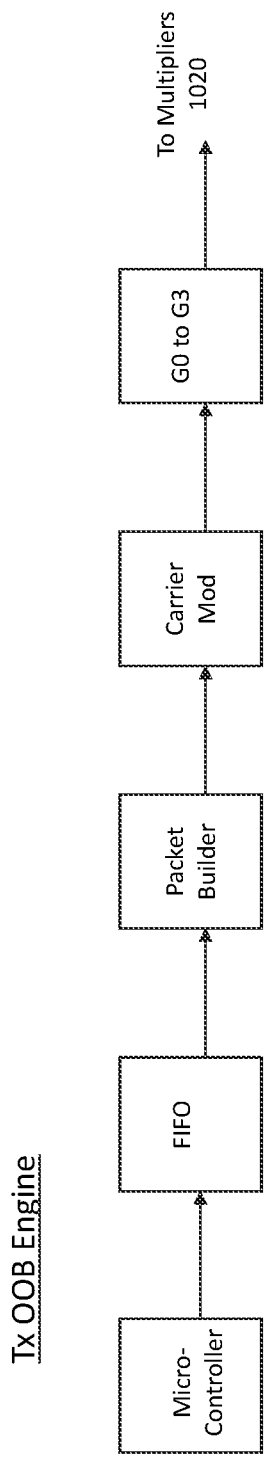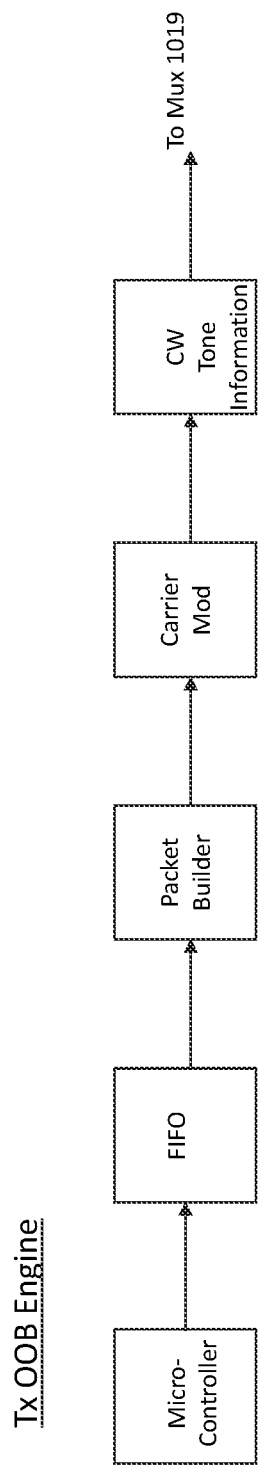
Fig. 10d
Fig. 10e

OUT-OF-BAND COMMUNICATION CHANNEL FOR POINT-TO-MULTI-POINT COMMUNICATIONS

CROSS REFERENCE TO RELATED APPLICATIONS

This application claims the benefit of U.S. Provisional Patent Application No. 63/113,973, filed Nov. 15, 2020, which is incorporated herein by reference in its entirety.

BACKGROUND

Optical communication systems typically include a first node that outputs optical carriers to one or more second nodes. The first and second nodes are connected to each other by one or more segments of optical fiber. The nodes in an optical communication system may include an internet protocol (IP) router, for example, as well as, a transceiver module that often plugs into the router and connects to the optical communication system fibers. In many circumstances, the transceiver modules and other node equipment, such as the router, are provided by the same vendor. As such, monitoring, status, and control information associated with the transceiver modules is communicated to a user's central software through the router or other node equipment. An optical service channel or ethernet connection, for example, may be coupled to an external port to provide the monitoring, status, and control information to the central software. The central software, however, typically cannot access or manage the transceiver modules independently of the node equipment. Moreover, transceivers typically do not communicate directly with other equipment in the communication system, such as equipment coupled along the optical fibers ("line system components") in the system as well as other transceivers. That is, transceivers are typically not separately addressable managed entities from the node equipment and lack a direct data path for communicating control information to/from the transceiver. Since such data paths traditionally are made through the node equipment, transceivers purchased from a vendor other than the node equipment vendor may be incompatible with the node equipment, such that a control information data path may not be made directly to the transceiver. Accordingly, such transceivers may not be adequately monitored or controlled.

Without a capability of communicating control information directly with the transceivers, customers may be precluded from purchasing transceivers from vendors other than the vendor that also supplies the node equipment. Such customers, therefore, may not realize cost savings that would otherwise be achieved by purchasing node equipment and transceivers from different vendors.

SUMMARY

In an aspect, a transmitter includes a laser, a digital signal processor, digital-to-analog conversion circuitry, modulator driver circuitry, and an optical modulator. The laser is operable to supply an optical signal. The digital signal processor is operable to supply first electrical signals based on first data input to the digital signal processor and second data input to the digital signal processor. The digital-to-analog conversion circuitry is operable to output second electrical signals based on the first electrical signals. The modulator driver circuitry is operable to output third electrical signals based on the second electrical signals. The optical modulator is operable to supply first and second modulated optical signals based on the third electrical signals. The first modulated optical signal includes a plurality of first optical subcarriers carrying user data. The second modulated optical signal includes a second optical subcarrier.

Implementations of this aspect can include one or more of the following features.

In some implementations, the second data is control data including information associated with at least one of the transmitter or a receiver operable to receive the second modulated optical signal.

In some implementations, each of the plurality of first subcarriers has a corresponding one of a plurality of first frequencies, and the second modulated optical signal has a second frequency different than each of said plurality of first frequencies.

In some implementations, the control data is first control data. The digital signal processor is operable to receive second control data, and the modulator is further operable to amplitude modulate the first and second modulated optical signals based on the second control data.

In some implementations, the transmitter is operable such that the first and second modulated optical signals are supplied to an optical communication path. An optical component is coupled to the optical communication path, the second control data being associated with a parameter of the optical component.

In some implementations, the transmitter is disposed in a first node, and the first and second modulated optical signals are supplied to an optical communication path. A second node is optically coupled to the optical communication path. The first control data is associated with a parameter of the second node.

In some implementations, the second control data is associated with an optical component optically coupled to the optical communication path between the first and second nodes.

In some implementations, the control data is first control data. The modulator driver circuitry is operable to receive second control data. The modulator is further operable to amplitude modulate the first and second modulated optical signals based on the second control data.

In another aspect, a receiver includes a polarization beam splitter, an optical hybrid circuit, photodiode circuitry, analog-to-digital conversion circuitry, and a digital signal processor. The polarization beam splitter has an input and first and second outputs. The input is configured to receive first and second modulated optical signals. The first modulated optical signal carries information indicative of user data and including a plurality of optical subcarriers, and second modulated optical signal is polarization modulated based on control data, such that the first output supplies a first portion of the first and second modulated optical signals and the second output supplies a second portion of the first and second modulated optical signals. The optical hybrid circuit is operable to provide optical mixing products based on the first portion of the first and second modulated optical signals, the second portion of the first and second modulated optical signals, and a local oscillator signal. The photodiode circuitry is operable to provide first electrical signals based on the optical mixing products. The analog-to-digital conversion circuitry is operable to provide second electrical signals based on the first electrical signals. The digital signal processor is operable to provide the user data and the control data based on the second electrical signals.

Implementations of this aspect can include one or more of the following features.

In some implementations, the receiver further includes a local oscillator laser operable to supply the local oscillator signal.

In some implementations, each of the plurality of subcarriers has a corresponding one of a plurality of first frequencies, the second modulated optical signal having a second frequency different than each of said plurality of first frequencies.

In some implementations, the first portion of the data is a '1' bit and a second portion of the data is a '0' bit.

In some implementations, the user data is associated with a subset of the plurality of optical subcarriers.

In some implementations, the control data is first control data, and the first and second modulated optical signals are further amplitude modulated based on second control data.

In some implementations, the receiver further includes a mean square detector circuit operable to output a signal indicative of the second control data.

In some implementations, the mean square detector is coupled to the analog-to-digital conversion circuitry.

In some implementations, the receiver is disposed in a first node, and the first and second modulated optical signals are received from an optical communication path. A second node is optically coupled to the optical communication path to supply the first and second modulated optical signals. The first control data is associated with a parameter of the second node.

In some implementations, the second control data is associated with an optical component optically coupled to the optical communication path between the first and second nodes.

In another aspect, a transceiver includes a first digital signal processor, a modulator, a photodiode circuit, and a second digital processor. The first digital signal processor is operable to supply first electrical signals. The modulator is operable to supply a first optical signal based on the first electrical signals, the first optical signal including a first plurality of optical subcarriers, the first plurality of optical subcarriers not overlapping one another in frequency, and a second optical signal that carries first control information. The first optical signal is modulated to carry second control information. The first control information is associated with another transceiver remote from the modulator. The second control information is associated with an optical component connected to an optical communication path that optically couples the transceiver to said another transceiver. The photodiode circuit is operable to receive a third optical signal including a second plurality of optical subcarriers, the second plurality of optical subcarriers not overlapping one another in frequency, and a fourth optical signal that carries third control information. The third optical signal is modulated to carry fourth control information. The photodiode circuit supplies a second electrical signal based on the third optical signal. The second digital processor is operable to supply data indicative of the control third and fourth control information based on the second electrical signal. The third control information is associated with said another transceiver remote. The fourth control information is associated with the optical component connected to the optical communication path.

In another aspect, an apparatus includes an optical tap, a photodiode, an analog-to-digital conversion circuit, and clock and data recovery circuitry. The optical tap is configured to be coupled to an optical communication path. The optical communication path is operable to carry a modulated optical signal carrying a plurality of optical subcarriers. The plurality of optical subcarriers do not spectrally overlap one another. The optical tap has first and second outputs, the first output configured to supply a first portion of the modulated optical signal and the second output configured to supply a second portion of the modulated optical signal. An optical power associated with the first portion of the modulated optical signal is less than an optical power associated with a second portion of the modulated optical signal. The plurality of optical subcarriers are amplitude modulated based on control data at a first frequency, and each of the plurality of optical subcarriers is modulated to carry user data at a second frequency greater than the first frequency. The photodiode is operable to receive the first portion of the modulated optical signal. The photodiode is operable to supply an analog signal based on the received first portion of the modulated optical signal. The analog-to-digital conversion circuit is operable to generate a digital signal based on the analog signal. The clock and data recovery circuitry is operable to supply the control data based on the digital signal.

Implementations of this aspect can include one or more of the following features.

In some implementations, the control data is indicative of a parameter associated with an optical component coupled to the optical communication path.

In some implementations, the optical component is an erbium doped fiber amplifier.

In some implementations, the optical component is a wavelength selective switch.

In some implementations, the optical communication path further carries a polarization modulated optical signal.

In some implementations, the apparatus is co-located with the optical component.

In some implementations, the apparatus further includes a variable optical attenuator coupled to the optical communication path. The variable optical attenuator is operable to receive, via a first optical port, the second portion of the modulated optical signal from the optical tap. The variable optical attenuator is further operable to receive, via a second optical port, a second analog signal. The variable optical attenuator is further operable to attenuate the second portion of the modulated optical signal according to the second analog signal, and output the attenuated second portion of the modulated optical signal.

In some implementations, the optical tap is configured to be coupled to the optical communication path between a first end of the optical communication path and a second end of the optical communication path opposite the first end of the optical communication path. The first end of the optical communication path includes a transmitter, and the second end of the optical communication path includes a receiver.

In another aspect, an apparatus includes a source of control data, digital-to-analog conversion circuitry, and a variable optical attenuator. The digital-to-analog conversion circuitry is operable to receive the control data and output an analog signal. The variable optical attenuator has a first optical port and a second optical port. The first optical port is operable to receive an optical signal including a plurality of optical subcarriers transmitted on an optical communication path. The plurality of optical subcarriers do not spectrally overlap one another. The variable optical attenuator is operable to amplitude modulate the optical signal to provide an amplitude modulated optical signal based on the analog signal. The amplitude modulated optical signal includes the plurality of optical subcarriers.

Implementations of this aspect can include one or more of the following features.

In some implementations, the control data is indicative of a parameter associated with an optical component coupled to the optical communication path.

In some implementations, the optical component is an erbium doped fiber amplifier.

In some implementations, the optical component is a wavelength selective switch.

In some implementations, the first optical port further receives a polarization modulated optical signal transmitted on the optical communication path.

In some implementations, the variable optical attenuator is configured to be coupled to the optical communication path between a first end of the optical communication path and a second end of the optical communication path opposite the first end of the optical communication path. The first end of the optical communication path includes a transmitter, and the second end of the optical communication path includes a receiver.

In another aspect, an apparatus includes a first optical input port, a first optical output port, a first electrical circuit, a second electrical circuit, a second optical input port, and a variable optical attenuator. The first optical input port is coupled to a first optical communication path and is operable to receive a first amplitude modulated optical signal transmitted on the first optical communication path. The first amplitude modulated optical signal includes a first plurality of optical subcarriers. The first amplitude modulated optical signal is amplitude modulated based on first control data. The first optical output port is operable to output the first amplitude modulated optical signal. The first electrical circuit includes a photodiode operable to receive a portion of the first amplitude modulated optical signal and provide a first electrical signal based on the portion of the first amplitude modulated optical signal. The second electrical circuit is operable to output the first control data based on the first electrical signal. The second optical input port is coupled to a second optical communication path operable to receive a second optical signal including a second plurality of optical subcarriers transmitted on the second optical communication path. The variable optical attenuator is operable to receive the second plurality of optical subcarriers and amplitude modulate the second plurality of optical subcarriers based on second control data to provide a second amplitude modulated optical signal.

Implementations of this aspect can include one or more of the following features.

In some implementations, the second control data is indicative of a parameter associated with an optical component coupled to the second optical communication path.

In some implementations, the optical component is an erbium doped fiber amplifier.

In some implementations, the optical component is a wavelength selective switch.

In some implementations, the first amplitude modulated optical signal includes a first polarization modulated optical signal and the second amplitude modulated optical signal includes a second polarization modulated optical signal.

In some implementations, the first electrical circuit is configured to be coupled to the first optical communication path between a first end of the first optical communication path and a second end of the first optical communication path opposite the first end of the first optical communication path. The first end of the first optical communication path includes a first transmitter, and the second end of the first optical communication path includes a first receiver. The variable optical attenuator is configured to be coupled to the second optical communication path between a first end of the second optical communication path and a second end of the second optical communication path opposite the first end of the second optical communication path. The first end of the second optical communication path includes a second transmitter, and the second end of the second optical communication path includes a second receiver.

In another aspect, an apparatus includes a laser, a digital signal processor, digital to analog circuitry, driver circuitry, and a modulator. The laser is operable to supply an optical signal. The digital signal processor is operable to supply digital signals. The digital to analog circuitry is operable to provide analog signals based on the digital signals. The driver circuitry is coupled to the digital to analog circuitry, and is operable to supply at least one drive signal. The modulator operable to receive said at least one drive signal, modulate the optical signal based on said at least one drive signal to provide a plurality of optical subcarriers, amplitude modulate the plurality of optical subcarriers at a first frequency to carry first control information, and modulate the plurality of subcarriers at a second frequency to carry second control information.

Implementations of this aspect can include one or more of the following features.

In some implementations, each of the optical subcarriers is a Nyquist subcarrier.

In some implementations, the first frequency is in a range of 3 MHz to 4 MHz and the second frequency is in a range of 6 MHz to 7 MHz.

In some implementations, the plurality of optical subcarriers is a first plurality of optical subcarriers. The apparatus further includes a receiver operable to receive a second plurality of optical subcarriers, each of which is amplitude modulated at a third frequency.

In some implementations, the first frequency is within a first band and the second frequency is within a second band. The third frequency is within the first band or the second band.

In some implementations, the second plurality of optical subcarriers is further amplitude modulated at a fourth frequency different than the third frequency.

In some implementations, the first frequency is within a first band and the second frequency is within a second band. The third frequency is within the first band and the fourth frequency being within the second band.

In another aspect, an apparatus includes an optical hybrid circuit, a photodiode circuit, analog to digital conversion circuitry, and a digital signal processor. The optical hybrid circuit is operable to receive a plurality of optical subcarriers. The plurality of optical subcarriers is amplitude modulated at a first frequency to carry first control information and amplitude modulated at a second frequency to carry second control information. The optical hybrid circuit is also operable to receive a local oscillator signal, and provide mixing products based on the local oscillator signal and the plurality of optical subcarriers. The photodiode circuit operable to provide first electrical signals based on the mixing products. The analog to digital conversion circuitry is operable to output digital signals based on the first electrical signals. The digital signal processor is operable to provide data associated with the plurality of optical subcarriers. The apparatus also includes circuitry operable to receive second electrical signals based on first electrical signals and output the first and second control information based on the first electrical signals.

Implementations of this aspect can include one or more of the following features.

In some implementations, each of the optical subcarriers is a Nyquist subcarrier.

In some implementations, the first frequency is in a range of 3 MHz to 4 MHz and the second frequency is in a range of 6 MHz to 7 MHz.

In some implementations, the plurality of optical subcarriers is a first plurality of optical subcarriers. The apparatus further includes a receiver operable to receive a second plurality of optical subcarriers, each of which is amplitude modulated at a third frequency.

In some implementations, the first frequency is within a first band and the second frequency is within a second band. The third frequency is within the first band or the second band.

In some implementations, the second plurality of optical subcarriers is further amplitude modulated at a fourth frequency different than the third frequency.

In some implementations, the first frequency is within a first band and the second frequency is within a second band. The third frequency is within the first band and the fourth frequency being within the second band.

In some implementations, the apparatus further includes a plurality of filter circuits, each of which has a corresponding one of a plurality of passbands. The plurality of optical subcarriers is further amplitude modulated at a third frequency different than the first and second frequencies. The plurality of filter circuits block signals being associated with the third frequency.

In another aspect, an apparatus includes a transmitter and a receiver. The transmitter includes a laser, a digital signal processor, digital to analog circuitry, driver circuitry, and a modulator. The laser is operable to supply an optical signal. The digital signal processor is operable to supply digital signals. The digital to analog circuitry is operable to provide analog signals based on the digital signals. The driver circuitry is coupled to digital to analog circuitry, and is operable to supply at least one drive signal. The modulator is operable to receive said at least one drive signal, modulate the optical signal based on said at least one drive signal to provide a first plurality of optical subcarriers, amplitude modulate the first plurality of subcarriers at a first frequency to carry first control information, and modulate the first plurality of subcarriers at a second frequency to carry second control information. The receiver includes an optical hybrid circuit, a photodiode circuit, analog to digital conversion circuitry, and a digital signal processor. The optical hybrid circuit is operable to receive a second plurality of optical subcarriers. The second plurality of optical subcarriers are amplitude modulated at a third frequency to carry third control information and amplitude modulated at a fourth frequency to carry fourth control information. The optical hybrid circuit is also operable to receive a local oscillator signal, and provide mixing products based on the local oscillator signal and the plurality of optical subcarriers. The photodiode circuit is operable to provide first electrical signals based on the mixing products. The analog to digital conversion circuitry is operable to output digital signals based on the first electrical signals. The digital signal processor is operable to provide data associated with the plurality of optical subcarriers, The receive also includes circuitry operable to receive second electrical signals based on first electrical signals and output the third and fourth control information based on the first electrical signals.

Implementations of this aspect can include one or more of the following features.

In some implementations, the laser is further operable to supply the local oscillator signal.

In some implementations, each of the optical subcarriers is a Nyquist subcarrier.

In some implementations, the first frequency is in a range of 3 MHz to 4 MHz and the second frequency is in a range of 6 MHz to 7 MHz.

In some implementations, the second plurality of optical subcarriers is further amplitude modulated at a third frequency.

In some implementations, the first frequency is within a first band and the second frequency is within a second band. The third frequency is within the first band or the second band.

In some implementations, the second plurality of optical subcarriers is further amplitude modulated at a fourth frequency different than the third frequency.

In some implementations, the first frequency is within a first band and the second frequency is within a second band. The third frequency is within the first band and the fourth frequency being within the second band.

In another aspect, an optical communication system includes a primary transceiver, a component, and a plurality of secondary transceivers. The primary transceiver is operable to supply a first plurality of optical subcarriers to a optical communication path, the first plurality of optical subcarriers being amplitude modulated at a first frequency to carry first control information and being amplitude modulated at a second frequency to carry second control information. The component is operable to be coupled to the optical communication path. The component includes circuitry operable to detect the first control information. The plurality of secondary transceivers is coupled to a terminal end of the optical communication path. At least one of the plurality of secondary transceivers is operable to detect the second control information and block the first control information.

Implementations of this aspect can include one or more of the following features.

In some implementations, each of the plurality of subcarriers is a Nyquist subcarrier.

In another aspect, an optical communication system includes a primary transceiver, a plurality of secondary transceivers, a network management system, a component, a first data path, and a second data path. The primary transceiver is coupled to an optical communication path and is operable to supply a plurality of optical subcarriers to the optical communication path. The plurality of secondary transceivers is coupled to the optical communication path. The network management system includes software. The component is coupled to the optical communication path. The first data path is operable to carry first control information, the first data path extending from the primary transceiver to the software via the component. The second data path is operable to carry second control information, the second data path extending from the primary transceiver to at least one of the secondary transceivers via the optical component.

Implementations of this aspect can include one or more of the following features.

In some implementations, the optical communication system includes a third data path operable to carry third control information, the third data path extending from at least one of the secondary transceivers to the primary transceiver, the third data path supplying the third control information to the primary transceiver.

In some implementations, the optical communication system includes a fourth data path operable to carry fourth control information, the fourth data path extending from the central software to the primary transceiver, the fourth data path supplying the fourth control information to the primary transceiver.

In some implementations, the optical communication system includes a fifth data path operable to carry fifth control information, the fifth data path extending from the central software to at least one of the secondary transceivers, the fifth data path supplying the fifth control information to said at least one of the secondary transceivers.

In some implementations, the optical communication system includes a sixth data path operable to carry sixth control information, the sixth data path extending from at least one of the plurality of secondary transceivers to the central software, the sixth data path supplying the sixth control information to the central software.

In some implementations, the first data path is associated with an amplitude modulation of the plurality of optical subcarriers.

In some implementations, the second data path is associated with a polarization modulated signal transmitted from the primary transceiver onto the optical communication path.

In some implementations, the first data path is associated with a first amplitude modulation of the plurality of optical subcarriers at a first frequency and a second amplitude modulation of the second plurality of optical subcarriers at a second frequency different than the first frequency.

In some implementations, each of the plurality of optical subcarriers is a Nyquist subcarrier.

In another aspect, a communication method is performed with respect to an optical communication system including a primary transceiver and a plurality of secondary transceivers. The method includes generating a plurality of optical subcarriers, amplitude modulating the plurality of optical subcarriers at a first frequency to carry first control information, amplitude modulating the plurality of optical subcarriers at a second frequency to carry second control information, and transmitting the plurality of subcarriers on a first optical communication path. The method also includes receiving the plurality of optical subcarriers from the first optical communication path at a receiver, detecting the first and second control information at the receiver, generating a second plurality of optical subcarriers, amplitude modulating the second plurality of optical subcarriers based on the second control information, transmitting the second plurality of optical subcarriers on a second optical communication path, and detecting the second control information at an optical component coupled to the second optical communication path.

Implementations of this aspect can include one or more of the following features.

In some implementations, the method further includes forwarding the second control information from the optical component to a network management system.

In some implementations, the method further includes providing a portion of each of the second plurality of optical subcarriers with an optical tap.

In some implementations, said detecting the second control information at the optical component is based on the portion of the second plurality of optical subcarriers.

In some implementations, the method further includes amplitude modulating the first plurality of optical subcarriers at a third frequency.

In some implementations, the method further includes filtering signals, at the receiver, associated with the third frequency.

In some implementations, each of the first plurality of optical subcarriers is a Nyquist subcarrier.

In some implementations, third control information is associated with the third frequency and the optical component is a first optical component. The method further includes transmitting the first plurality of subcarriers to a second optical component, and detecting the third control information at the third optical component.

In another aspect, one or more non-transitory computer readable media stores instructions that, when executed by one or more processors, cause the one or more processors to perform a number of operations. The operations include generating a plurality of optical subcarriers, amplitude modulating the plurality of optical subcarriers at a first frequency to carry first control information, amplitude modulating the plurality of optical subcarriers at a second frequency to carry second control information, and transmitting the plurality of subcarriers on a first optical communication path. The operations also includes receiving the plurality of optical subcarriers from the first optical communication path at a receiver, detecting the first and second control information at the receiver, generating a second plurality of optical subcarriers, amplitude modulating the second plurality of optical subcarriers based on the second control information, transmitting the second plurality of optical subcarriers on a second optical communication path, and detecting the second control information at an optical component coupled to the second optical communication path.

Implementations of this aspect can include one or more of the following features.

In some implementations, the method further includes forwarding the second control information from the optical component to a network management system.

In some implementations, the method further includes providing a portion of each of the second plurality of optical subcarriers with an optical tap.

In some implementations, said detecting the second control information at the optical component is based on the portion of the second plurality of optical subcarriers.

In some implementations, the method further includes amplitude modulating the first plurality of optical subcarriers at a third frequency.

In some implementations, the method further includes filtering signals, at the receiver, associated with the third frequency.

In some implementations, each of the first plurality of optical subcarriers is a Nyquist subcarrier.

In some implementations, third control information is associated with the third frequency and the optical component is a first optical component. The method further includes transmitting the first plurality of subcarriers to a second optical component, and detecting the third control information at the third optical component.

In some implementations, the method further includes transmitting the third control information to a network management system.

BRIEF DESCRIPTION OF THE DRAWINGS

FIGS. 7a to 7d shows power spectral density plots of optical subcarriers consistent the present disclosure;

FIGS. 10d and 10e show examples of out-of-band signal generator engines consistent with the present disclosure;

FIG. 11b shows an example of a portion of the receiver shown in FIG. 11a.

FIG. 12 shows, in greater detail, an example of the digital signal processor shown in FIG. 11a.

FIG. 13 shows in greater detail a portion of the digital signal processor shown in FIG. 11a.

Like reference numbers and designations in the various drawings indicate like elements.

DETAILED DESCRIPTION

Consistent with the present disclosure, control or communication paths are provided to transceivers installed in host equipment or added to node equipment to enable outside central software to exchange information with the transceivers directly. As a result, the central software can monitor and control the transceivers independently of and augment the control or communication signals that may be provided by the node equipment. The data paths disclosed herein also enable a line system component near a hub (or leaf) node to send to and receive directly from a transceiver located in the hub (or leaf) node also without access through the node equipment. Moreover, the data paths disclosed herein also facilitate exchange of control and management information between transceivers, such as transceivers provided in hub and leaf nodes. Further, since the data paths are independent of the node equipment bi-directional communication of control information can occur simultaneously without direct coordination between the transceivers and the node equipment. Customers may, therefore, combine transceivers or transceiver modules and node equipment from different vendors to thereby optimize performance and/or minimize costs.

The data paths may be realized through several example mechanisms that reduce or prevent interference between the data paths. In one example, a first data path between line system components and the transceivers is implemented with a low rate amplitude modulated signal that is superimposed or imparted on high data rate optical subcarriers output from the transceivers. In addition, a second data path is implemented through amplitude modulation of a subcarrier separate from the high data rate optical subcarriers. Additional data paths may be realized by amplitude modulating the high data rate optical subcarriers or sub-groups thereof, as well as amplitude modulating individual subcarriers dedicated for transmission of control channel information.

In a further example, control information is exchanged over a first data path between a transceiver (hub or leaf) and a line system component by way of a first amplitude modulation over a first band of frequencies or at a first frequency. The first amplitude modulation is superimposed on optical signals output from the transceiver module. The second data path is implemented, for example, by a second amplitude modulation over a second band of frequencies or a second frequency. The second amplitude modulation is further superimposed on the optical signals output from the transceiver along with the first amplitude modulation. The second amplitude modulation facilitates communication over a data path, for example, between transceivers.

Figure 1:
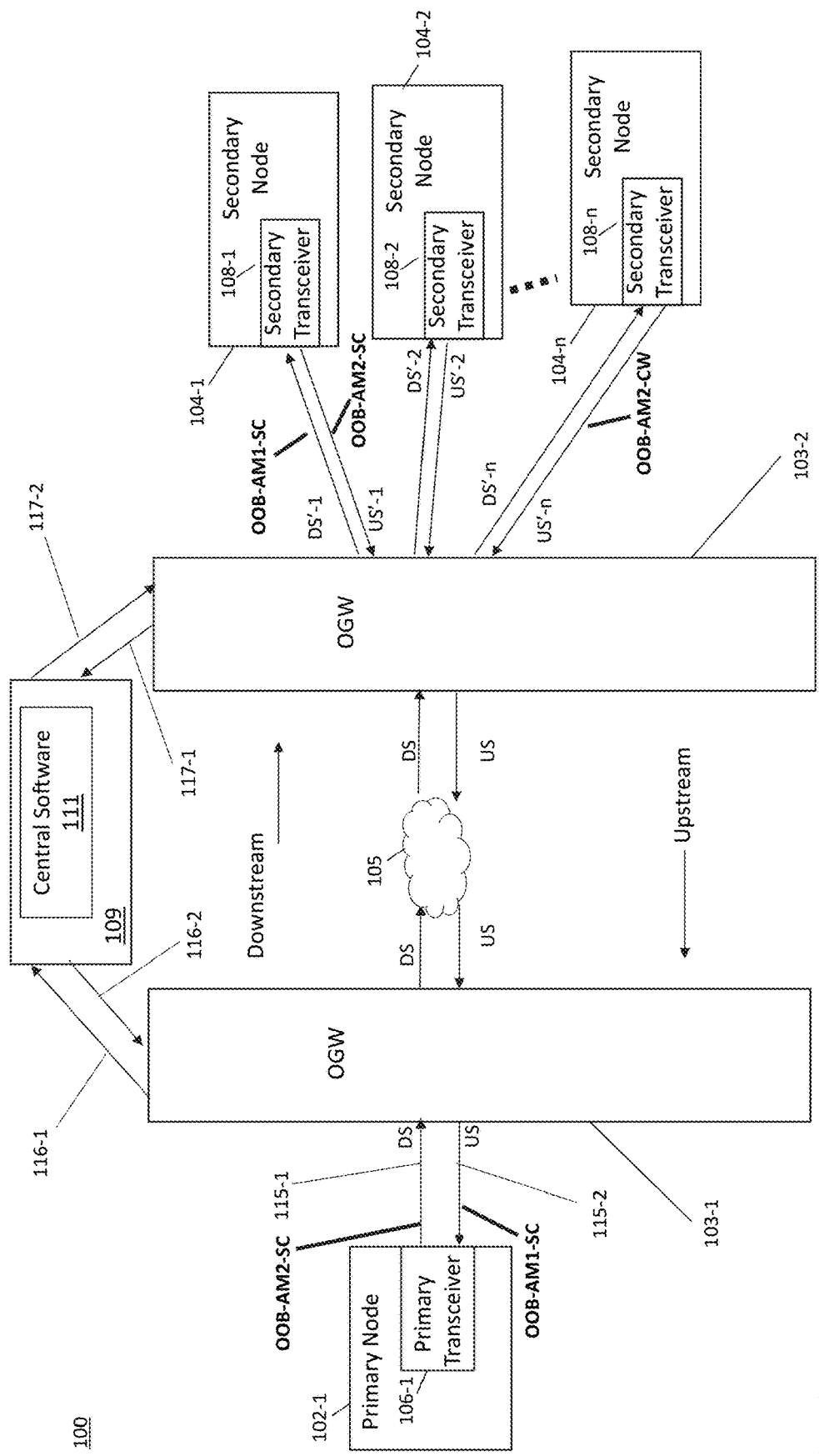
FIG. 1 is a diagram illustrating an example of an optical communication system and data paths through such system consistent with the present disclosure.
Figure 2A:
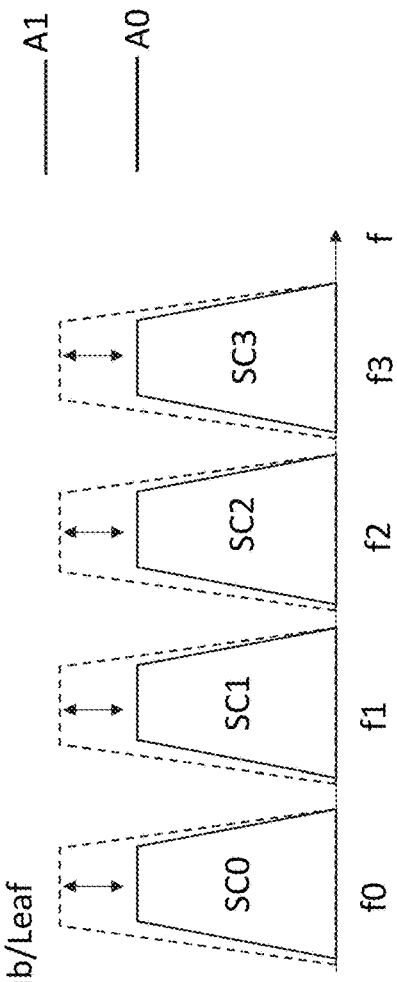
FIGS. 2a-2d show examples of sub-carriers of a communication channel and out-of-band amplitude modulation of such subcarriers consistent with the present disclosure.
Figure 2B:
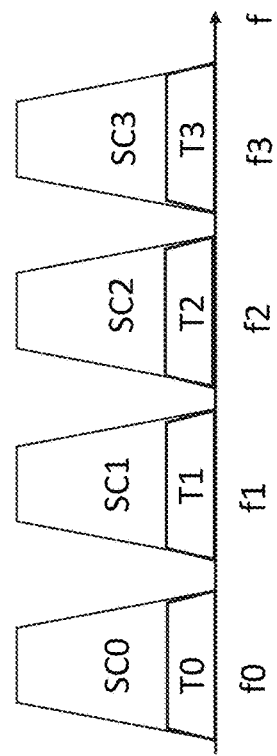
Figure 3:
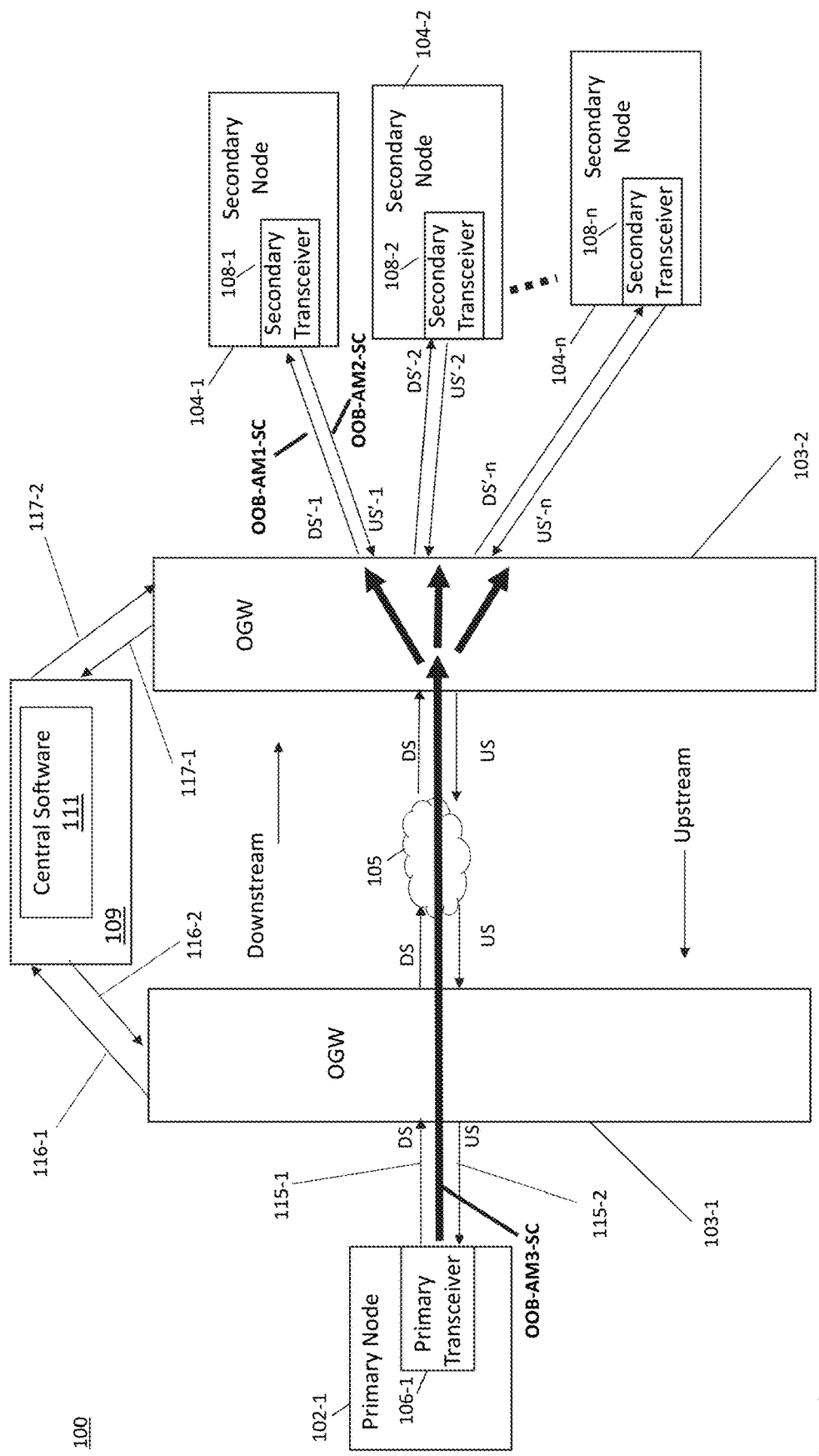
FIG. 3 is a diagram illustrating an example of an optical communication system consistent and additional data paths associated with such system consistent with the present disclosure.
Figure 4:
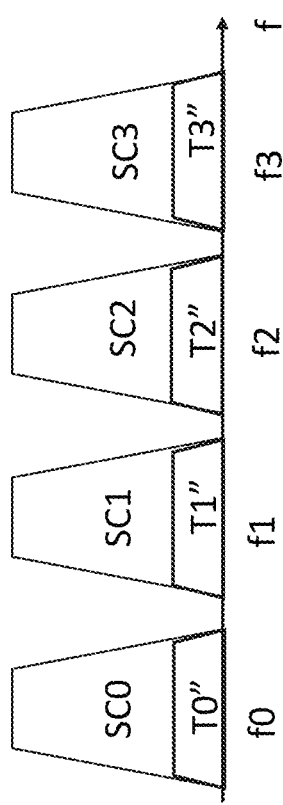
FIG. 4 shows an additional example of sub-carriers of a communication channel and out-of-band amplitude modulation of such subcarriers consistent with an aspect of the present disclosure.
Figure 5:
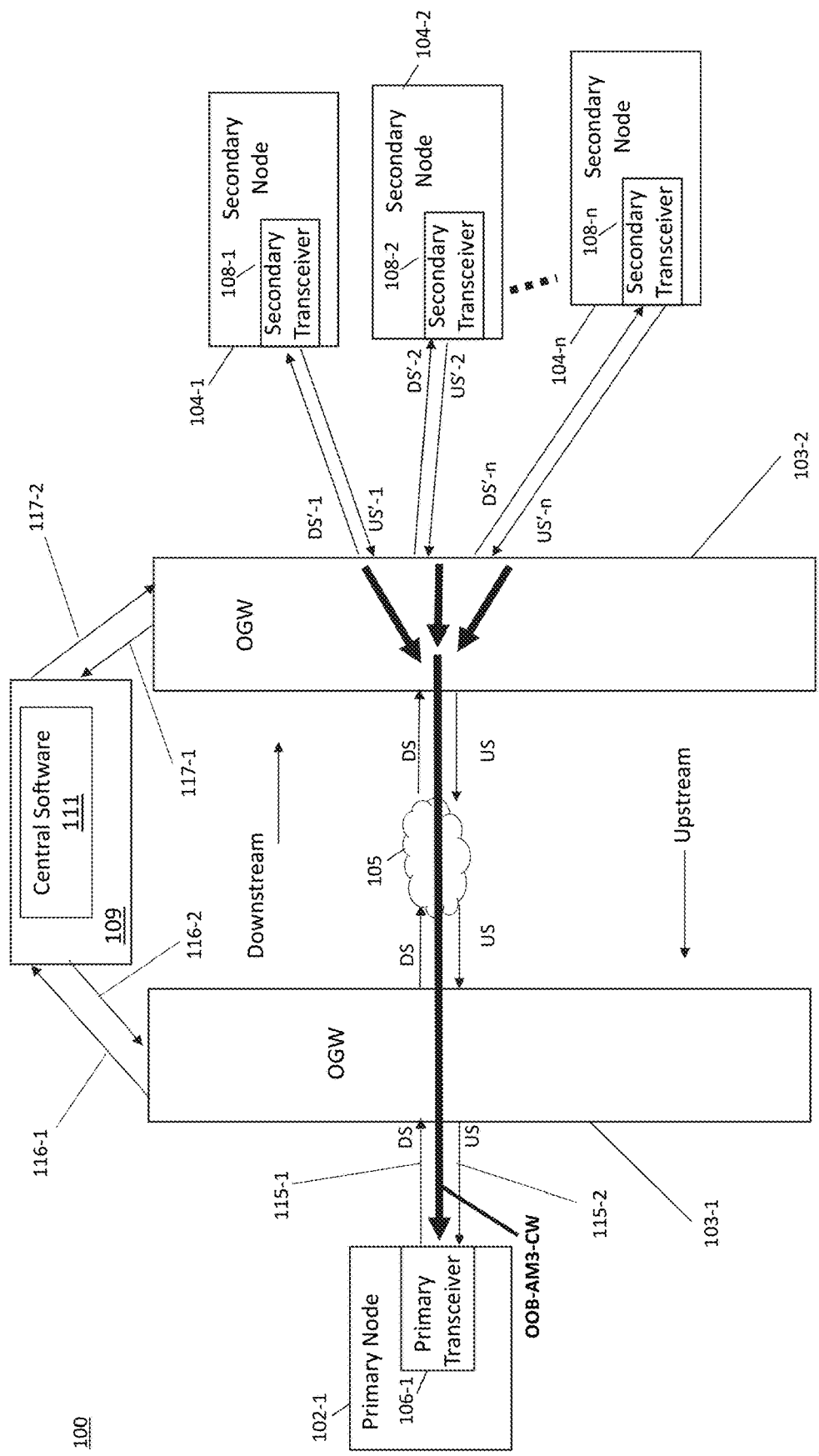
FIG. 5 is a diagram illustrating an example of an optical communication system consistent and additional data paths associated with such system consistent with the present disclosure.

Example data paths are discussed in greater detail below and shown in the drawings. Namely, FIGS. 1, 3, and 5 show examples of data path connections consistent with the present disclosure. FIGS. 2a-2d, 4, 6, and 7a-7d show example of amplitude modulation of optical subcarriers to transfer control information along the data path connections In a further example, amplitude modulation at the first frequency or over the first band of frequencies is associated with communication between a secondary or leaf node and a line system component in a second direction; amplitude modulation at the second frequency or over a second band of frequencies is associated with communication between one or more secondary node or leaf nodes and the hub or primary node in the second direction; and an amplitude modulation at the third frequency or over the third band of frequencies is associated with communication between a line system component and the primary or hub node in the second direction. Such communication in the second direction may be carried out on a second optical communication path.

I. Example Data Paths

Before describing the above noted data paths, an example optical communication system will next be described in which such data paths may be provided. In particular, FIG. 1 shows a block diagram of an optical communication system 100 consistent with an aspect of the present disclosure. Optical communication system 100 includes, for example, a primary node 102, such as a router. A primary transceiver or transceiver module 106, for example, is provided in primary node 102 that supplies downstream optical signal DS to optical fiber link 115-1, part of a first or downstream optical communication path, and receives upstream signal US from optical fiber links 115-2, part of a second or upstream optical communication path. Downstream optical signal DS is fed by fiber link 115-1 to an optical line system component, such as optical gateway OGW 103-1. As discussed in greater detail below with reference to FIG. 3, optical signals DS and US each include a plurality of optical subcarriers, such as Nyquist optical subcarriers, for example. OGW 103-1 also supplies signal US on fiber link 115-2 to primary transceiver 106.

As described below with reference to FIG. 7, OGW 103-1 includes optical and electrical components extract control channel information carried by signal DS and supply such information to central software 111, which may run on network management system 109, including one or more computers and/or processors. As shown in FIG. 1, link 116-1 may supply such control information to central software 111. As further described below with reference to FIG. 7, additional control information may be provided over link 116-2 to OGW 103-1, such that the optical and electrical circuitry in OGW 103-1 further outputs signal US with such additional control information for detection by transceiver 106.

OGW 103-1 outputs signal DS to one or more optical links, line system components, such as one or more optical amplifiers (e.g., erbium doped optical amplifier), wavelength selective switches (WSSs), power splitters and/or combiners, and optical multiplexers and/or demultiplexers (e.g., an arrayed waveguide grating). Such components are represented in FIG. 1 by sub-system 105. After propagating through sub-system 105, signal DS is supplied, for example, to another optical gateway (OGW) 103-2, which, in this example, may include an optical splitter in addition to the components or devices shown in FIG. 7. Accordingly, OGW 103-2 may provide a power split portion of signal DS, namely, DS'-1 to DS'-n to a respective one of secondary transceivers 108-1 to 108-n, each of which being provided in a respective one of secondary nodes 104-1 to 104-n and at least one of the transceivers being coupled to a terminal end of the downstream optical communication path. Each secondary node 104 may have a structure similar to primary node 102 and may operate in a manner similar to that described above with respect to primary node 102.

OGW 103-2 may operate in a manner similar to that described above with respect to OGW 103-1 to supply control information on link 117-1 to control software 111 and to separately supply the same or different control information to secondary transceivers 108. In addition, OGW 103-2 may operate in a manner similar to that of OGW 103-1 to receive control information from central software 111 via link 117-2, and separately receive the same or different control information from transceivers 108. Links 117-1 and 117-2 may carry the same type of signals as links 116-1 and 116-2.

As further shown in FIG. 1, each secondary transceiver 108 may have a structure similar to and operate in manner similar to that described above with respect to primary node 106. In one example, however, each of secondary transceivers 108 may supply modulated optical signal US'-1 to US'-n in an upstream direction. Each such optical signal may include one or more optical subcarriers. Collectively, a number the optical subcarriers output from secondary transceivers 108 may be equal to, less than, or greater than the number of optical subcarriers output from primary transceiver 106.

Optical signals US'-1 to US'-n may be combined by a combiner in OGW 103-2, and output, in combined form as upstream optical signal US, to sub-system 105. Optical signal US may then be provided to OGW 103-2, which outputs optical signal US onto fiber link 115-2, which supplies optical signal US to primary transceiver 106.

OGW 103-1 can communicate to primary node 102-1 and OGW 103-2 can communicate with secondary nodes 104 by modulating light passing therethrough with a variable optical attenuator, as discussed in greater detail below with respect to FIG. 7e.

In one example, out-of-band (OOB) signaling may be employed to communicate control information from/to primary node 102-1 to/from OGW 103-1; to/from primary node 102-1 from/to secondary nodes 104; and to/from secondary nodes 104 from/to OGW 103-2. Such control information includes, for example, operations information, such as automatic monitoring of the environment, detecting and determining faults, and alerting administrators. The control information further includes, in another example, involves performance statistics, capacity or allocated capacity to a primary or secondary node, and can also include usage data, and reliability information of the system or a particular node or nodes in the system. It can also include information for maintaining service databases. Maintenance information may include, information related to upgrades, fixes, new feature enablement, backing up and restoring data, and monitoring the media health. Provisioning information may include information for assigning capacity to a particular node and related services.

In one example, one or more subcarriers are amplitude modulated based on the control information to be transmitted. In the example shown in FIG. 2a, which is a power spectral density plot of optical subcarriers SC0 to SC3, the amplitudes of subcarriers SC0 to SC3 (each having a respective one of frequencies f0 to f3) may be collectively amplitude modulated together to vary the amplitude of each subcarrier between a first amplitude A1 and a second lower amplitude A0. When subcarriers SC0 to SC3 each have amplitude A1, a '1' bit, for example, is transmitted. On the other hand, when subcarriers SC0 to SC3 each have amplitude A0, a '0' bit, for example, is transmitted. In this manner, amplitude modulation is employed to transmit control information from OGW 103-1 to primary node transceiver 106-1. Similar amplitude modulation may be employed to transmit control information from OGW 106-2 to secondary node transceiver 108. It is noted that the difference between amplitude A1 and amplitude A0 may be referred to as a modulation depth. In one example, the modulation depth may be 0.3 dB and the amplitude modulation (AM) frequency may be 1.5 MHz. Such amplitude modulated signals from the OGW to either the primary node transceiver 106-1 or to the secondary node transceivers is referred to herein as OOB-AM1-SC. FIG. 2B shows an alternative representation of OOB-AM1-SC in which the amplitude modulation is represented by a respective one of trapezoids Ti to T3. It is understood, that the present disclosure is not limited to the number of subcarriers that are amplitude modulated or to a particular AM frequency. Also, in one example, OOB-AM1-SC may be transmitted in a upstream link 115-2 from OGW 103-1 to a receiver in primary transceiver 106-1, and OOB-AM1-Sc may be transmitted in downstream links DS'-1, DS'-2 to DS'-n from OGW 103-s to respective receivers in each of secondary transceiver 108. The control information carried by OOB-AM1-SC on upstream line 115-2 may be the same or different than the control information carried by OOB-AM1-SC on downstream links DS'-1, DS'-2 to DS'-n.

Since OGW 103-2 may broadcast to all secondary nodes 108 and associated transceivers, the OOB, in one example, carries message packets, which include address information to identify which secondary node or primary node is the intended recipient.

Figure 2C:
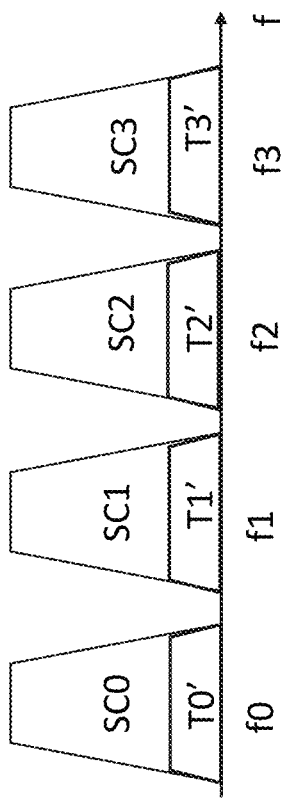

FIG. 2c illustrates an example of collective amplitude modulation of subcarriers SC0 to SC3 as AM signal OOB-AM2-SC on downstream link 115-1 output from a transmitter in primary transceiver 106-1 to OGW 103-1. OOB-AM2-SC may also be output from a transmitter in secondary transceivers 108 to OGW 103-2 on a respective one of upstream links US'-1 to US'-n. The control information carried by OOB-AM2-SC output from transmitters in secondary transceivers 108 may be different the control information carried by OOB-AM2-SC output from a transmitter in transceiver 106-1 on downstream link 115-1. Trapezoids T0' to T3' represent the amplitude modulation of a respective one of optical subcarriers SC to SC3. In one example, the AM frequency of OOB-AM2-SC is different than that of OOB-AM1-SC. In a further example, the AM frequency of OOB-AM2-SC is 5.5 MHz.

Consistent with a further aspect of the present disclosure and in one example, the primary node 102-1 or secondary node 104 with one of OGWs 103 by placing data packets on a carrier at 5.5 MHz and modulating the data envelope with a low modulation depth. As described in further detail below with reference to FIG. 7e, each OGW 103 may include a photodiode to detect the power envelope and demodulate the data from the AM modulation of the subcarriers. It is understood, that in one example, the rate of transmission of the control information is less than the transmission of user data carried by the subcarriers, which may be 50 Gbits/second, whereas transmission of control information may be 1.5 Mbits/second or 5.5 Mbits/sec, for example.

If a subcarrier has not yet been assigned to a particular secondary node 104, such secondary node 104 may still communicate with OGW 103-2, for example. At this point, however, the secondary node cannot transmit user data on a particular subcarrier because such subcarrier may interfere with or be in use by another secondary node. Accordingly, the secondary node 108, in one example, must first obtain a "beacon" via a subcarrier transmitted from the primary node 102 to the secondary nodes 104. Such beacon message may constitute collective amplitude modulation of a plurality of optical subcarriers in a manner similar to that described above. However, the frequency of such amplitude modulation may be different than the AM described above. For example, the beacon or OOB-AM3-SC from primary node 102 may be transmitted via the OGWs to the secondary nodes 104. The beacon, as shown in FIG. 4, may constitute a further collective amplitude modulation at an AM frequency, as represented by trapezoids T0" to T3", different that that of OOB-AM1-SC. In one example, the AM frequency of beacon OOB-AM3-SC may be 5.5 MHz. After receiving the beacon OOB-AM3-SC signal, frequency information may be determined based on the beacon so that a transmitter in the second node transceiver may output control-related information on a further subcarrier OOB-AM2-CW at a frequency f4 different than the other subcarrier frequencies SC0 to SC3 (see FIG. 2d). Frequency f4, in one example, may be selected in the primary node OOB-AM2-CW signal does not interfere with existing subcarriers SC0 to SC3. OOB-AM2-CW may be used to transmit control information to OGW 103-2, for example. Alternative, as described in further detail below, another carrier or subcarrier OOB-AM3-CW having a different frequency than OOB-AM2-CW, may be employed to send control information from secondary or leaf nodes 104 to the primary node 102.

Figure 2D:
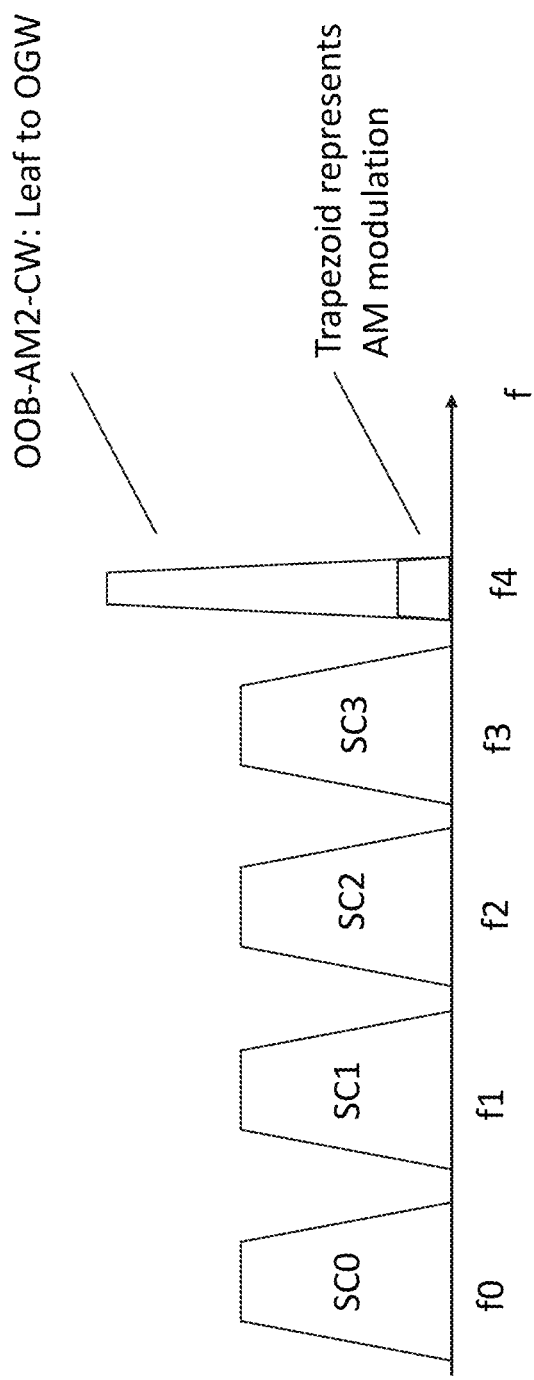

The secondary node may then place data packets on a subcarrier or carrier OOB-AM2-CW at 5.5 MHz, for example, by amplitude modulating the associated carrier or subcarrier having frequency f4 in FIG. 2d.

Figure 6:
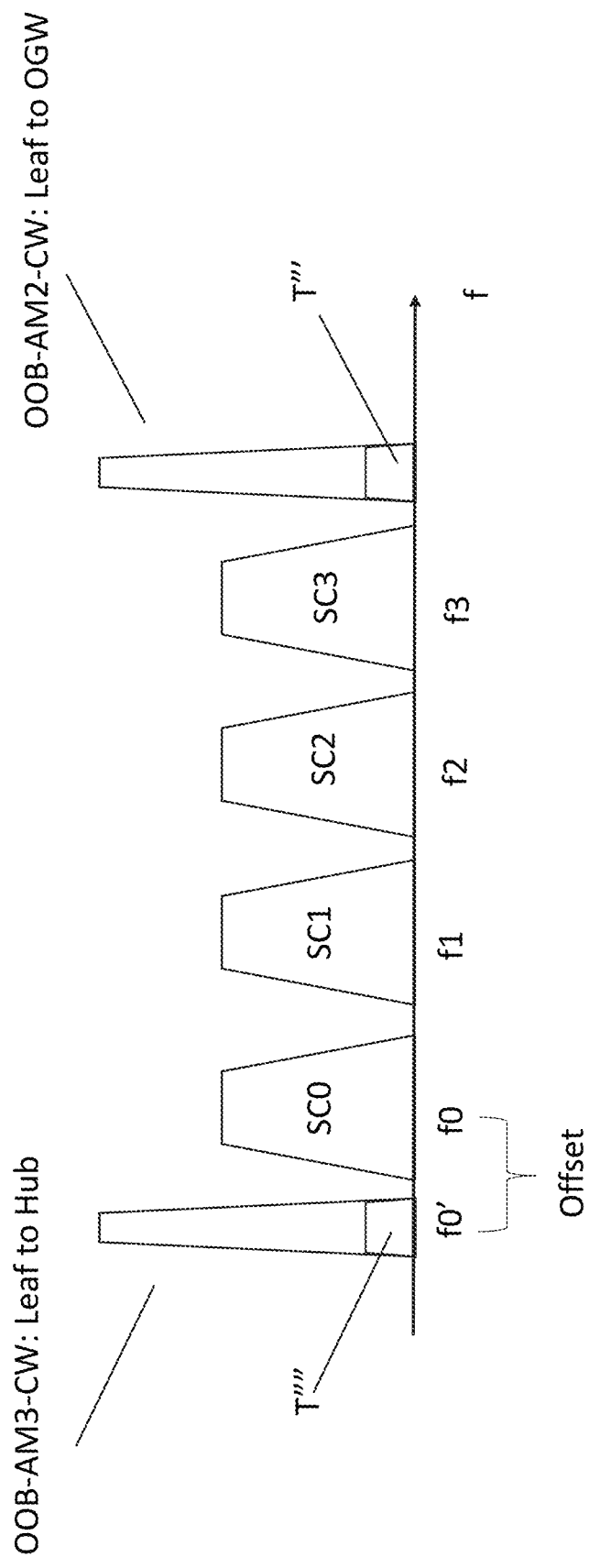
FIG. 6 shows an additional example of sub-carriers of a communication channel and out-of-band amplitude modulation of such subcarriers consistent with an aspect of the present disclosure.

In a further example, a separate or different CW tone for the OOB-AM2-CW and OOB-AM3-CW signals at frequency f0' (see FIG. 6). FIG. 5 illustrates multiple OOB signal OOB-AM3-CW supplied by a respective one of transmitters in secondary receivers 108, which are combined in OGW 103-2 and supplied via OGW 103-1 to a receiver in transceiver 106-1.

If one photodiode is used in OGW 103-2 after combining the leaf signals, the OOB-AM2-CW channel is typically transmitted from the secondary nodes 104 in burst-mode and a party-line protocol is employed.

The transmitted CW tone (either OOB-AM2-CW or OOB-AM3-CW) can have a relatively large modulation depth, but is typically kept at a power level where it does not disturb or interfere with other subcarriers, such as subcarriers SC0 to SC3.

As shown in FIG. 3, a transmitter in primary node transceiver 106-1 may broadcast an AM signal, for example, OOB-AM3-SC, to receivers in each of secondary nodes 104 by placing data packets by collectively modulating optical subcarriers r at 3.5 MHz, and modulating the data envelope with a low modulation index, as represented by trapezoids T0" to T3". All secondary nodes 104 will receive the same data so that each secondary node discards packets that are not intended for it (via an identification number processed in software stored in each secondary node 104, for example).

If communications between a hub primary node 102 and a leaf or secondary node 104 has not been established, or there is a fault between the secondary node 104 and the primary node 102, the secondary node 104 may send data packets to primary node 102 on a shared party-line channel. A transmitter in the secondary node 104 will lock its laser wavelength to a wavelength associated with the incoming hub sub-carriers SC0 to SC3. The transmitter in the secondary node 104 will then generate a CW carrier or subcarrier and AM modulate (as represented by trapezoid T"") such CW carrier or subcarrier shown as OOB-AM3-CW (see FIG. 6). A separate CW tone (and frequency—frequency f0' for OOB-AM3-CW and frequency f4 for OoB-AM2-CW) is used for the OOB-AM2-CW and OOB-AM3-CW signals. The hub or primary node receiver will detect the OOB-AM3-CW tone at specific frequency offsets from one or more of subcarriers SC0 to SC3 (see f-offset in FIG. 6).

In one example, the OOB-AM3-CW tone will be switched off when no messages are transmitted. In a further example, CW carrier at frequency f0' will also be removed when no messages are being transmitted, such as in a burst mode. In an additional example, a secondary node 104 receives subcarriers, such as SC0 to SC3, from the primary node 102 so that it may align its laser frequency to that of the primary node laser, but it will not be transmit subcarriers. In this example, will only transmit control information.

Consistent with a further aspect of the present disclosure, the following method may be carried out when a secondary node, for example is added to a system including a primary node and a plurality of pre-existing secondary node. The newly added secondary node receives the OOB-AM3-SC message beacon, as noted above. Having locked its clock and laser frequency to the correct position, the leaf may transmit using an AM modulated CW (continuous wave) tone, e.g., OOB-AM3-CW. Messages from other leaves may collide with transmitted CW tone, such that a party-line protocol must be employed.

A receiver in primary node transceiver 106-1 can detect OOB-AM3-CW channels transmitted at one or more of frequencies (A-E), as shown in FIGS. 7a to 7d. Such frequencies may be selected based on the capacity of the primary node, as well as the number of subcarriers. For example, the primary node will detect secondary node CW signals at frequencies A and E, if sixteen channels or subcarriers are employed by the hub 102 (see FIG. 7a). If twelve subcarriers are employed the primary node will detect CW signals output from the secondary nodes are frequencies A, C, E. If eight subcarriers are employed at the hub, the hub will detect CW signals at frequencies B and D, and if four subcarriers are employed, the hub receiver will detect CW signals at frequency C.

Reception and transmission of control information at a line system component, such as optical gateway (OGW) 103-1 will next be described with reference to FIG. 7. As noted above, the techniques described herein are used to provide communications between a hub or primary node 102 using amplitude modulation (AM) of subcarriers SC0 to SC3.

Figure 7E:
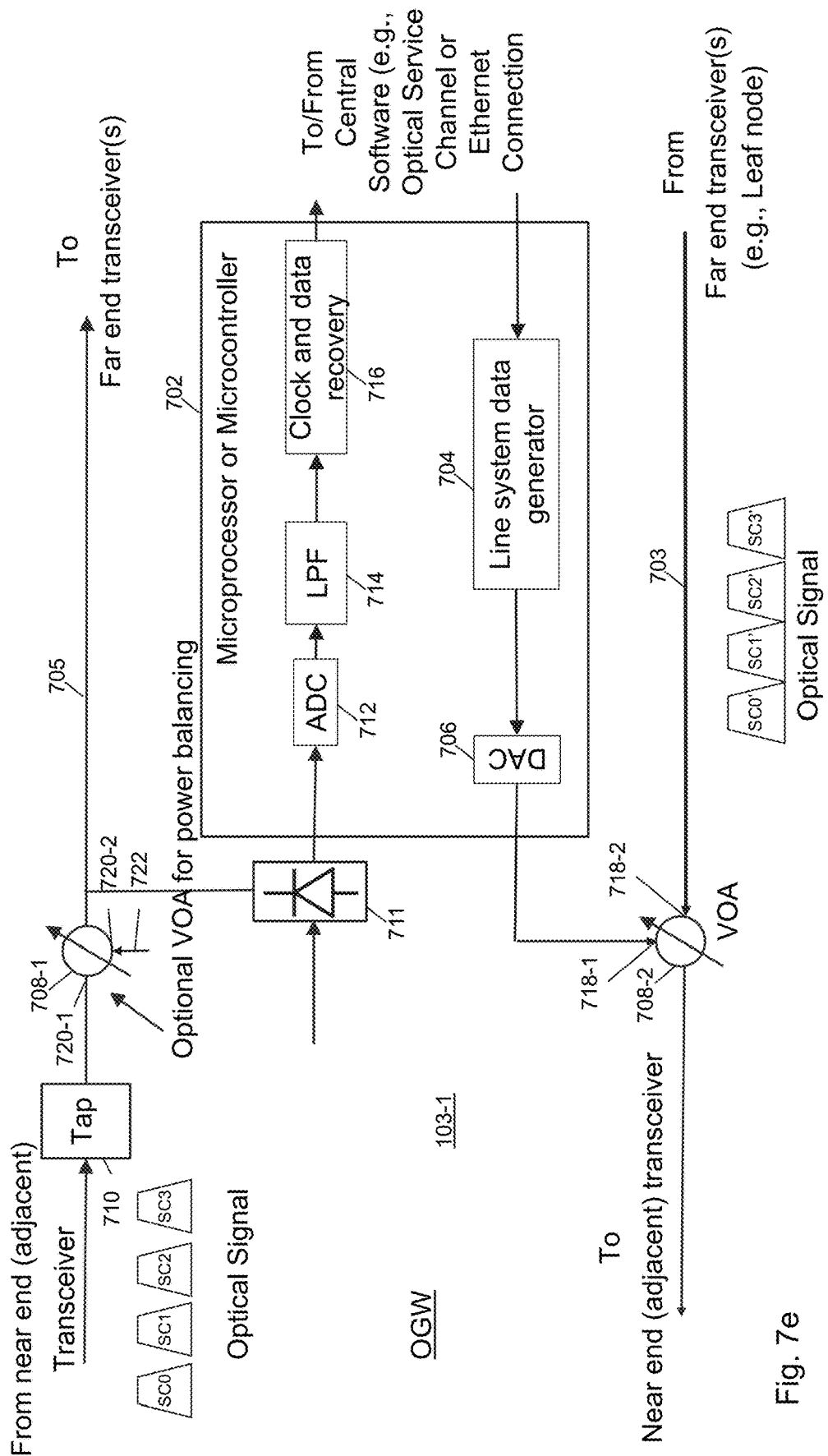
FIG. 7e is a diagram showing example devices of an example line system component in an optical communication system.

As shown in FIG. 7e, OGW 103-1 generally includes a microprocessor or DSP 702, a line system data generator 704, a digital-to-analog conversion circuit 706 ("DAC 706"), and one or more variable optical attenuators (VOAs) 708-1, 708-2. In some implementations, one or more of the devices associated with OGW 103-1 can be placed at various locations along an optical communication path between an example primary or hub node 102 and an example secondary or edge/leaf node 104 of system 100. For example, one or more of the devices associated with OGW 103-1 can be placed adjacent to a splitter/combiner or in between two distinct splitters that are each intermediate a primary node 102 and a secondary node 104. OGW 103-1 may also be provided adjacent an optical amplifier.

Transmission of control information from OGW 103-1 to either transceiver 106 or one of transceivers 108 will next be described. As noted above, control information is provided based on the status of the line system component or other information associated with the line system component. Such information may include operations, administration, maintenance, and provisioning (OAM&P) information, such as, if line system component is adjacent an optical amplifier, the gain of the amplifier or which optical signals (by wavelength) are input to the amplifier. Alternatively, the control information may include an indication of which optical signals and subcarriers are input to/output from which ports of a WSS. Such information may be supplied to circuitry in microprocessor or microcontroller 702 referred to as a line system data generator 704, which control data that is to be transmitted to a near end transceiver, for example. The line system generator may provide the control data based on measured parameters associated with optical communication path or fiber links 705 and/or 703, for example. Alternatively, control information may be supplied to line system generator 704 by central software 111. In a further example, control information may be supplied directly from the central software to DAC 706. In any event, OGW 103-1 typically transmits control information to the transceiver closest to it, namely primary transceiver 106. OGW 103-2, having a similar construction as OGW 103-1, transmits control information to one or more of transceivers 108, which are closest to OGW 103-2.

Line system data generator 704 may supply the control information as a digital or binary electrical signal to a digital-to-analog conversion circuit 706, which converts the received signal to an analog signal indicative of the control information to be transmitted. The analog signal is then provided to variable optical attenuator (VOA) 708-2, for example via an optical input port 718-1 (e.g., an interface for receiving optical signals). VOA 706-2 may also receive an optical signal including a plurality of subcarriers SC0' to SC3', each having a corresponding one of frequencies f0' to f3', for example via an optical input port 718-2. In this example, subcarriers SC0' to SC3' are transmitted from one or more of secondary transceivers 108 on optical fiber or optical communication path 703. Based on the analog signal received via the input port 718-1, VOA 706-2 collectively adjusts the attenuation, and thus the amplitude or intensity, of subcarriers SC0' to SC3' based on the control information. As a result, subcarriers SC0' to SC3' are amplitude modulated to carry such control information to a receiver in either primary transceiver 106 or a receiver in one or more of secondary transceivers 108.

Detection of an optical signal including amplitude modulated subcarriers transmitted on optical communication path 705 from a near end transceiver, such as subcarriers SC0 to SC3 transmitted from primary node transceiver 106, will next be described. The optical signal is input to optical tap 710, which may provide an optical power split portion of the optical signal, e.g., 1% to 10%, to a photodiode circuit 711. A remaining portion of the optical signal continues to propagate along optical communication path 705. VOA 708-1 may optionally be provided for power balancing. For example, the VOA 708-1 can receive the signal output by the optical tap 710 via an optical input port 720-1, and attenuate the signal according to an analog signal 722 received via the optical input port 720-2 (e.g., control information received from on more sources).

As further shown in FIG. 7e, the tapped portion of the optical signal is converted by photodiode circuit 711 to a corresponding analog electrical signal, e.g., a voltage or a current. The analog signal is fed to an analog-to-digital conversion circuit 712, which supplies digital signals based on the received analog signal. Such digital signals are optionally provided to a bandpass pass filter 714 and then output to conventional clock and data recovery circuitry 716, which outputs the control information to central software 111, for example by way of an optical signal, such as an optical service channel (OSC), or by way of an electrical signal, such as an ethernet signal.

A parameter associated with line system component may be adjusted or controlled based on the received control information. For example, if the line system component includes an optical amplifier, such as an erbium doped fiber amplifier, the control information may include instructions or other data for adjusting a gain of the optical amplifier. Alternatively, or in addition, the control information may include information for adjusting an attenuation of VOA 708-1.

Figure 8:
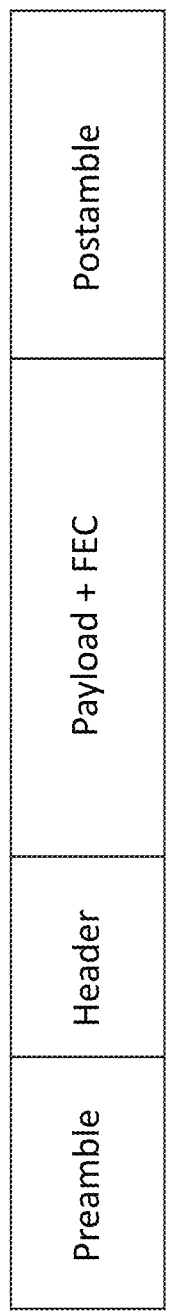
FIG. 8 shows an example of a packet consistent with an aspect of the present disclosure.

FIG. 8 shows an example of a packet consistent with the present disclosure. The packet shown in FIG. 8 includes a first series of bits that may constitute a preamble. A second series of bits constituting a header may follow the preamble. The header bits may be differentially encoded with a gold-code that preferably has strong correlation properties for packet detection. An additional set of symbols or bits acts as an absolute reference for the carrier-phase estimator to lock. A third series of bits follows the header. The third series of bits may constitute a payload forward error correction (FEC) encoded to correct for errors that may occur during transmission, for example. An optional fourth series of bits may follow the payload as a postamble. During time intervals when OOB messages or control information are transmitted, the control data may be replaced with pseudo random bit sequncy (PRBS) data. Alternatively, if the OOB data control information may be transmitted based on burst-transmission, and the OOB signal is switched off. The payload may include identifying information indicative of an intended recipient node, either a primary node or a secondary node, for subsequent transmission of user data.

Figure 9A:
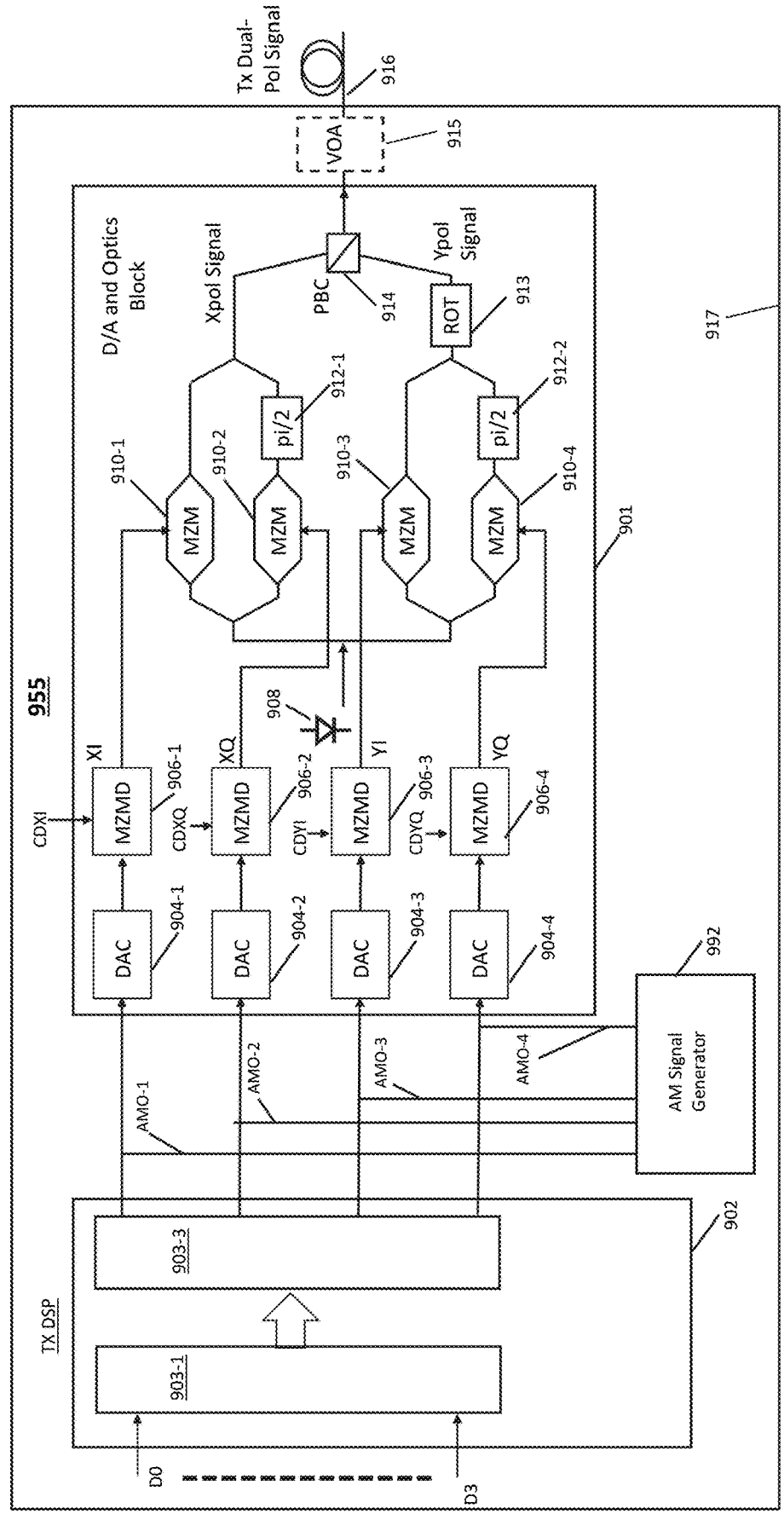
FIG. 9a shows an example of a transmitter consistent with a further aspect of the present disclosure.

FIG. 9a is a diagram showing an example transmitter 955 that, for example, is included in primary transceiver 106-1. It is understood that transmitters in secondary transceivers 108 may have a similar configuration as that shown in FIG. 4a. Transmitter 955 includes a digital signal processor 902 including circuit blocks 903-1, 903-2, and 903-3. Circuit block 903-1 receives, in this example, first data including one or more of eight data streams D1 to D8, each carrying user data or information. Such data is processed, as discussed in greater detail with respect to FIG. 5, and the processed data is provided to circuit block 903-3.

As further shown in FIG. 9a, block 903-3 supplies digital signals to digital-to-analog conversion circuits 904-1 to 904-4 of D/A and Optics block 901.

Each of DACs 904 is operable to output second electrical signals based on the first electrical signals supplied by the Tx DSP 902. The D/A and optics block 901 also includes modulator driver circuitry 906 ("driver circuits 906") corresponding to each of Mach-Zehnder modulator driver (MZMD) 906-1, 906-2, 906-3, and 906-4. Each of driver circuits 906 is operable to output third electrical signals based on the second electrical signals output by each of the DAC 904.

The D/A and optics block 901 includes optical modulator circuitry 910 ("modulator 910") corresponding to each of MZM 910-1, 910-2, 910-3, and 910-4. Each of modulators 910 is operable to supply or output first and second modulated optical signals based on the third electrical signals. The first modulated optical signal includes multiple optical subcarriers 300 carrying user data and is modulated to include control data to be transmitted between nodes of system 100 and AM modulated data, as well as a modulated CW signal, as noted above.

Each of the modulators 910-1 to 910-4 of D/A and optics block 901 may be a Mach-Zehnder modulator (MZM) that modulates the phase and/or amplitude of the light output from laser 908. As further shown in FIG. 9a, a light beam output from laser 908 (also included in block 901) is split such that a first portion of the light is supplied to a first MZM pairing including MZMs 910-1 and 910-2 and a second portion of the light is supplied to a second MZM pairing including MZMs 910-3 and 910-4.

The first portion of the light is further split into third and fourth portions, such that the third portion is modulated by MZM 910-1 to provide an in-phase (I) component of an X (or TE) polarization component of a modulated optical signal, and the fourth portion is modulated by MZM 910-2 and fed to phase shifter 912-1 to shift the phase of such light by 90 degrees in order to provide a quadrature (Q) component of the X polarization component of the modulated optical signal.

Similarly, the second portion of the light is further split into fifth and sixth portions, such that the fifth portion is modulated by MZM 910-3 to provide an I component of a Y (or TM) polarization component of the modulated optical signal, and the sixth portion is modulated by MZM 910-4 and fed to phase shifter 912-2 to shift the phase of such light by 90 degrees to provide a Q component of the Y polarization component of the modulated optical signal.

The optical outputs of MZMs 910-1 and 910-2 are combined to provide an X polarized optical signal including I and Q components and fed to a polarization beam combiner (PBC) 914 provided in block 901. In addition, the outputs of MZMs 910-3 and 910-4 are combined to provide an optical signal that is fed to polarization rotator 913, further provided in block 901, that rotates the polarization of such optical signal to provide a modulated optical signal having a Y (or TM) polarization. The Y polarized modulated optical signal is also provided to PBC 914, which combines the X and Y polarized modulated optical signals to provide a polarization multiplexed ("dual-pol") modulated optical signal onto optical fiber 916. In some examples, optical fiber 916 may be included as a segment of optical fiber in an example optical communication path of system 100.

In some implementations, the polarization multiplexed optical signal output from D/A and optics block 901 includes subcarriers SC0-SC3, for example, such that each data subcarrier SC0-SC3 has X and Y polarization components and I and Q components. Moreover, each data subcarrier SC0 to SC3 may be associated with a respective one of data inputs D0 to D3.

Several examples of amplitude modulation of subcarriers SC0 to SC3 consistent with the present disclosure will next be described. As shown in FIG. 4a, each of control signals CDXI, CDXQ, CSYI, and CDYQ may be supplied to respective one of Mach-Zehnder modulation driver circuits 906-1 to 906-4. These control signals are indicative of control data to be communicated with the line system components, and, based on these control signals, driver circuits 906 may further adjust the analog signals received from DACs 904 in accordance with such control data, such that modulators 910 are driven in such a manner as to collectively amplitude modulate subcarriers SC1 to SC8 to carry the control data.

In another example, a variable optical attenuator (VOA) 915 may be provided to receive an optical signal including subcarriers SC1 to SC8 output from polarization beam combiner 914. VOA 915 may operable to adjust or vary the attenuation of the subcarriers based on a control signal supplied thereto. By varying the attenuation experienced by optical subcarriers SC1 to SC8, the amplitude or intensity of such subcarriers may be adjusted or controlled, such that subcarriers SC1 to SC8 are amplitude modulated to carry control information based on the control signal supplied to VOA 915.

Transmitter 955 may be provided in module 917, which may also house a receiver portion of primary transceiver 106. Although VOA 915 is shown inside module 917, it is understood that VOA 915 may be provided outside module 917 to provide amplitude modulation of subcarriers SC1 to SC8 external to module 917.

In another example, amplitude modulation may be achieved by providing an amplitude modulation (AM) signal generator 992 which provides each of outputs AMO-1 to AMO-4 to a respective input of DACs 904-1 to 904-4. These signals are generated in such a way that DACs 904 output analog signals that include an amplitude modulation overlaying or superimposed on the data carrying DAC outputs. Based on such DAC outputs, Mach-Zehnder modulator driver circuits (MZMDs) 906, in turn, output drive signal to MZMs 910, as noted above. Accordingly, the combined MZM outputs supply optical subcarriers superimposed with an amplitude modulation based on the outputs of signal generator 992 (see also FIG. 3). Both X and Y polarization components, for example, of each optical subcarrier are subject to such amplitude modulation.

Figure 9B:
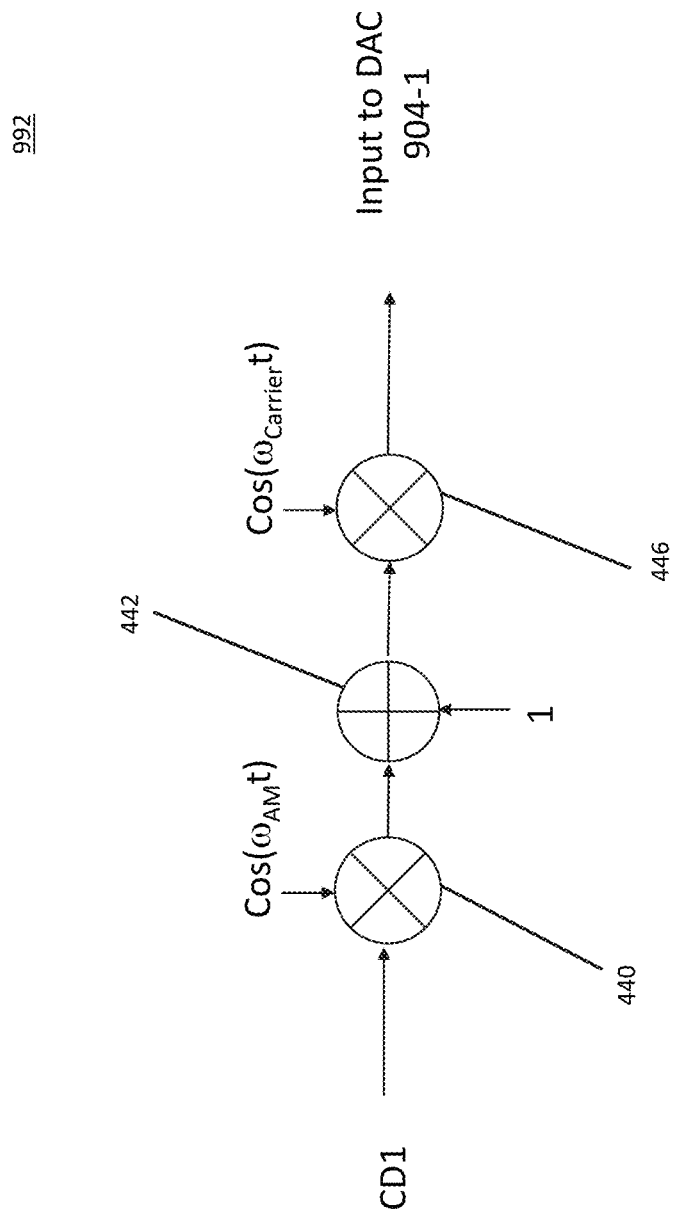
FIG. 9b shows a portion of the transmitter in greater detail.

AM signal generator portion 992-1 provides an input to DAC 904-1 and is shown in detail in FIG. 9b. In this example, AM signal generator portion 992-1 receives control data CD1, which may be multiplied, with multiplier 440, by a cosine function, $\cos(\omega_{AM} t)$, where $\omega_{AM}$ is indicative of a frequency of the amplitude modulation and t is time. The resulting product is output from multiplier 440 and provided to adder circuit 442, which adds the number to the product output from multiplier 440 to insure that a positive number is obtained. The output or sum of adder 442 is next provided to multiplier circuit 446, which multiplies such sum by another cosine function, $\cos(\omega_{Carrier} t)$, where $\omega_{Carrier}$ is a carrier frequency and t is time. In one example, $\omega_{Carrier}$ is equal to zero. In other examples, $\omega_{Carrier}$ is on the order of multiple GHz. The resulting product (AMO-1) is added or combined with a corresponding output of DSP 902 and input to DAC 904-1.

It is understood that circuitry similar to that shown in FIG. 9b is also included in AM signal generator 992 to provide similar signals (AMO-2 to AMO-3) to the inputs of remaining DACs 904-2 to 904-4. As noted above, based on such inputs, MZMs 910 (collectively, the MZMs are also considered a modulator), output optical subcarriers that are collectively amplitude modulated to carry control information. The example shown in FIG. 9b may be implemented as an alternative to the other amplitude modulation examples described in connection with FIG. 9a, as well as described below in connection with FIGS. 10b and 10c.

Figure 10A:
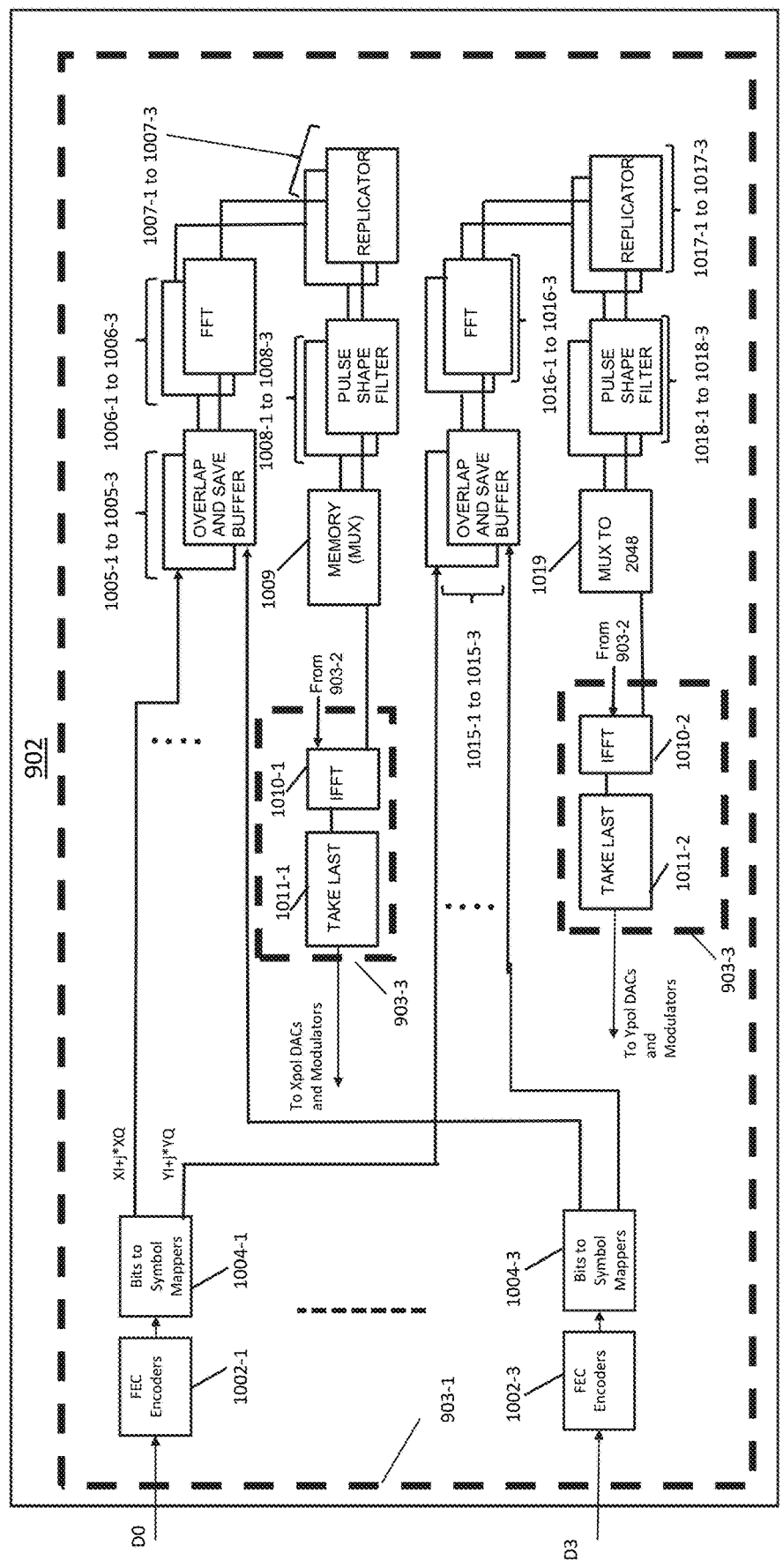
FIG. 10a shows a block diagram of a digital signal processor provided in a transmitter consistent with an aspect of the present disclosure.

FIG. 10a shows blocks 903-1 and 903-3 of FIG. 9a in greater detail. As further noted above, block 903-1 receives user data streams or inputs D1 to D8. As shown in FIG. 10a, each such data stream is supplied to a respective one of forward error correction (FEC) encoders 1002-0 to 1002-3. FEC encoders 1002-0 to 1002-3 carry out forward error correction coding on a corresponding one of the switch outputs, such as, by adding parity bits to the received data. FEC encoders 1002-0 to 1002-3 may also provide timing skew between the subcarriers to correct for skew introduced during transmission over one or more optical fibers. In addition, FEC encoders 1002-0 to 1002-3 may interleave the received data.

Each of FEC encoders 1002-0 to 1002-3 provides an output to a corresponding one of multiple bits to symbol circuits, 1004-0 to 1004-3 (collectively referred to herein as "1004"). Each of bits to symbol circuits 1004 may map the encoded bits to symbols on a complex plane. For example, bits to symbol circuits 1004 may map four bits to a symbol in a dual-polarization Quadrature Phase Shift Keying (QPSK) or and m-quadrature amplitude modulation (m-QAM, m being a positive integer) constellation, such as 8-QAM, 16-QAM, and 64-QAM. Each of bits to symbol circuits 1004 provides first symbols, having the complex representation XI+j*XQ, associated with a respective one of the data input, such as D0, to DSP portion 1003. Data indicative of such first symbols may carried by the X polarization component of each subcarrier SC0-SC8.

Each of bits to symbol circuits 1004 may further provide second symbols having the complex representation YI+j*YQ, also associated with a corresponding one of data inputs D0 to D8. Data indicative of such second symbols, however, is carried by the Y polarization component of each of subcarriers SC-0 to SC-3.

As further shown in FIG. 10, each of the first symbols output from each of bits to symbol circuits 1004 is supplied to a respective one of first overlap and save buffers 1005-0 to 1005-3 (collectively referred to herein as overlap and save buffers 1005) that may buffer 256 symbols, for example. Each of overlap and save buffers 1005 may receive 128 of the first symbols or another number of such symbols at a time from a corresponding one of bits to symbol circuits 1004. Thus, overlap and save buffers 1005 may combine 128 new symbols from bits to symbol circuits 1004, with the previous 128 symbols received from bits-to-symbol circuits 1004.

Each overlap and save buffer 1005 supplies an output, which is in the time domain, to a corresponding one of fast Fourier Transform (FFT) circuits 1006-0 to 1006-3 (collectively referred to as "FFTs 1006"). In one example, the output includes 256 symbols or another number of symbols. Each of FFTs 1006 converts the received symbols to the frequency domain using or based on, for example, a fast Fourier transform. Each of FFTs 1006 may include 256 memories or registers, also referred to as frequency bins or points, that store frequency components associated with the input symbols. Each of replicator components 1007-0 to 1007-3 may replicate the 256 frequency components associated with of FFTs 1006 and store such components in 512 or another number of frequency bins (e.g., for T/2 based filtering of the subcarrier) in a respective one of the plurality of replicator components. Such replication may increase the sample rate. In addition, replicator components or circuits 1007-0 to 1007-3 may arrange or align the contents of the frequency bins to fall within the bandwidths associated with pulse shaped filter circuits 1008-0 to 1008-3 described below.

Each of pulse shape filter circuits 1008-0 to 1008-3 may apply a pulse shaping filter to the data stored in the 512 frequency bins of a respective one of the plurality of replicator components 1007-0 to 1007-3 to thereby provide a respective one of multiple filtered outputs, which are multiplexed and subject to an inverse FFT, as described below. Pulse shape filter circuits 1008-1 to 1008-3 calculate the transitions between the symbols and the desired subcarrier spectrum so that the subcarriers can be spectrally packed together for transmission, e.g., with a close frequency separation. Pulse shape filter circuits 1008-0 to 1008-3 may also be used to introduce timing skew between the subcarriers to correct for timing skew induced by links between nodes shown in FIG. 1, for example. Memory component 1009, which may include a multiplexer circuit or memory, may receive the filtered outputs from pulse shape filter circuits 1008-0 to 1008-3, and multiplex or combine such outputs together to form an element vector.

The output of memory 1009 is fed to block 903-3, which includes, in this example, IFFT circuit or component 1010-1. IFFT circuit 1010-1 may receive the element vector and provide a corresponding time domain signal or data based on an inverse fast Fourier transform (IFFT). In one example, the time domain signal may have a rate of 64 G Sample/s. Take last buffer or memory circuit 1011-1 may select the last 1024 or another number of samples from an output of IFFT component or circuit 1010-1 and supply the samples to DACs 904-1 and 904-2 at 64 G Sample/s, for example. As noted above, DAC 904-1 is associated with the in-phase (I) component of the X pol signal and DAC 904-2 is associated with the quadrature (Q) component of the Y pol signal. Accordingly, consistent with the complex representation XI+jXQ, DAC 904-1 receives values associated with XI and DAC 904-2 receives values associated with jXQ. Based on these inputs, DACs 904-1 and 904-2 provide analog outputs to MZMD 906-1 and MZMD 906-2, respectively, as discussed above.

As further shown in FIG. 5, each of bits to symbol circuits 1004-0 to 1004-3 outputs a corresponding one of symbols indicative of data carried by the Y polarization component of the polarization multiplexed modulated optical signal output on optical communication path or fiber 916. As further noted above, these symbols may have the complex representation YI+j*YQ. Each such symbol may be processed by a respective one of overlap and save buffers 1015-0 to 1015-3, a respective one of FFT circuits 1016-0 to 1016-3, a respective one of replicator components or circuits 1017-0 to 1017-3, pulse shape filter circuits 1018-0 to 1018-3, multiplexer or memory 1019 of block 903-1. Moreover, the output of multiplexer or memory 1019 may be fed to block 903-3, which further includes IFFT 1010-2, and take last buffer or memory circuit 1011-2, to provide processed symbols having the representation YI+j*YQ in a manner similar to or the same as that discussed above in generating processed symbols XI+j*XQ output from take last circuit 1011-1. In addition, symbol components YI and YQ are provided to DACs 904-3 and 904-4, respectively. Based on these inputs, DACs 904-3 and 904-4 provide analog outputs to MZMD 906-3 and MZMD 906-4, respectively, as discussed above.

Block 903-3 also receives outputs from block 903-2 as noted above and discussed in greater detail below with respect to FIG. 13.

While FIG. 10a shows Tx DSP 902 as including a particular quantity and arrangement of functional components, in some implementations, DSP 902 may include additional functional components, fewer functional components, different functional components, or differently arranged functional components. In addition, typically the number of overlap and save buffers, FFTs, replicator circuits, and pulse shape filters associated with the X component may be equal to the number of data inputs, and the number of such circuits associated with the Y component may also be equal to the number of switch outputs. However, in other examples, the number of data inputs may be different than the number of these circuits. As noted above, based on the outputs of MZMDs 906-1 to 906-4, multiple optical subcarriers SC0 to SC3 may be output onto optical fiber 916.

A further example of circuitry that may be employed to amplitude modulation subcarriers SC0 to SC3 to carry control information will next be described with reference to FIG. 10b. Here, a plurality of multiplier circuits 1020-0 to 1020-3, which may be complex multiplier circuits, are provided within DSP 902, to receive a respective one of outputs O1 to O4 from a corresponding one of pulse shape filters 1018-0 to 1018-3. Each of multiplier circuits 1020-1 to 1020-4 receives a corresponding one of gain parameters G0 to G3, such that, in this example, each of outputs O0 to O3 is multiplied by a corresponding one of gain parameters G0 to G3. Each output O0 to O3 is associated with a respective one of subcarriers SC0 to SC3. Moreover, each is associated with a gain or amplitude of a respective one of the subcarriers. That is, the amplitude of each of optical subcarriers SC0 to SC3 output from optical modulators 910 may be based on the gain parameters G0 to G3. Thus, by varying gain parameters G0 to G3, the amplitude of optical subcarriers SC0 to SC3 may also be varied or modulated. Gain parameters G0 to G3, may therefore be adjusted or controlled to amplitude modulate subcarriers SC0 to SC3 to carry control information to the line system components or primary and/or secondary nodes as the case may be.

Gain parameters G0 to G3 may be generated by a Tx OOB engine as discussed in greater detail below.

In some implementations, the gain of each multiplier 1020 is software programmable (or may be implemented in firmware) along with a frequency shaping function in a filter 1018 preceding the multiplexing performed by multiplexer or memory 1019.

Figure 10B:
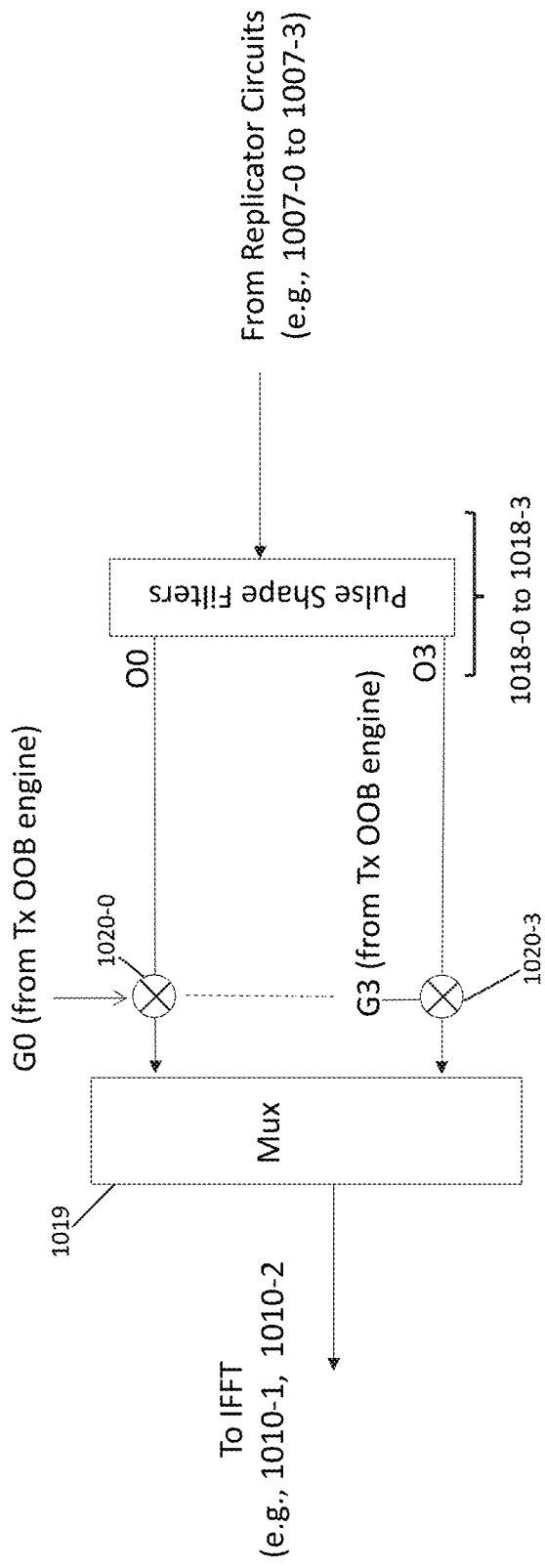
FIGS. 10b and 10c show portions of the digital signal processor of FIG. 10a in greater detail.

Preferably, in the example shown in FIG. 10b, the gain parameter changes or variations are synchronized to occur at the same time or substantially the same time so that the amplitudes of subcarriers SC0 to SC3 vary at the same time or substantially the same time to provide OOB AM1-SC, OOB-AM2-SC, and OOB-AM3-SC noted above. Moreover, the above-described multiplier circuits 1020 may be included in DSP 902 to provide amplitude modulation of the Y polarization component of each of subcarriers SC0 to SC3. It is understood that similar multiplier circuits may be provided between pulse shape filters 1008 and memory 1009 to provide corresponding amplitude modulation of the X polarization component of each subcarrier SC0 to SC3.

Figure 10C:
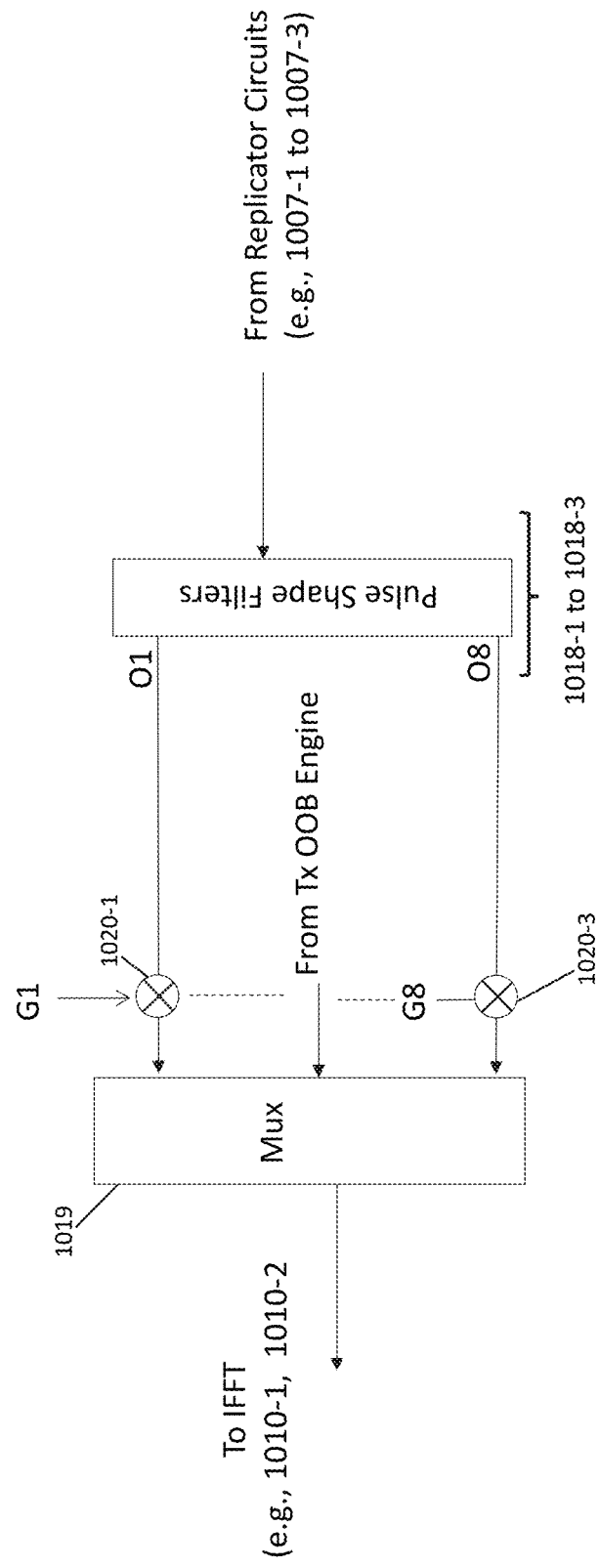

Consistent with a further aspect of the present disclosure and as shown in FIG. 10c, the TX OOB engine described below may provide signals or frequency domain data to mux 1019, such data will result in a carrier or subcarrier carrying control information, as noted above. For example, such data may be associated with modulated CW tone frequency f0' or f4 to provide OOB-AM2-CW and OOB-AM3-CW.

FIG. 10c shows an example of a TX OOB engine for collectively modulating optical subcarrier SC0 to SC3 to provide signals OOB-AM1-SC, OOB-AM2-SC, and OOB-AM3-3, for example. The TX OOB engine includes a micro-controller transfers 128-byte messages to a memory, such as a FIFO byte-buffer. A packet builder circuit generates packets, as noted above, based on outputs of the FIFO buffer by adding pre-amble, frame-header, the message payload, FEC, and a postamble. The binary data is then amplitude modulated by carrier modulator block onto subcarriers SC0 to SC3 as noted above at AM frequencies for example of 1.5, 3.5, 5.5 MHz by supplying appropriate gain parameters G0 to G3 to respective multipliers 1020.

FIG. 10d shows a similar TX OOB engine as that shown in FIG. 10c. However, the carrier modulator block supplies signals to a CW tone information generating circuit which feeds frequency domain data to multiplexer 1019, which as noted above results in signals OOB-AM2-CW and OOB-AM3-CW. The data may be modulated onto the subcarriers SC0 to SC3 or SCs at frequencies f0' or f4 as the case may be using a gapped clock such that the OOB data rate is independent of the processing rate of subsequent blocks.

Detection of amplitude modulated subcarriers output will next be described with reference to FIG. 11a and FIG. 11b, which show an optical receiver that may be provided in primary transceiver 106 or one or more of secondary transceivers 108. It is understood that the structure and operation of OGW 103-2 is similar to that of OGW 103-1. Module 1155 is included as a receiver in transceiver 106, for example. It is understood that the transmitter and receiver provided in secondary transceivers 108 may have a similar structure and operate in a similar manner as the transmitter and receiver provided in primary transceiver 106. That is, such transmitters in both the primary and second transceivers may have structure similar to or the same as transmitter 955 and receiver module 1155, respectively.

Figure 11A:
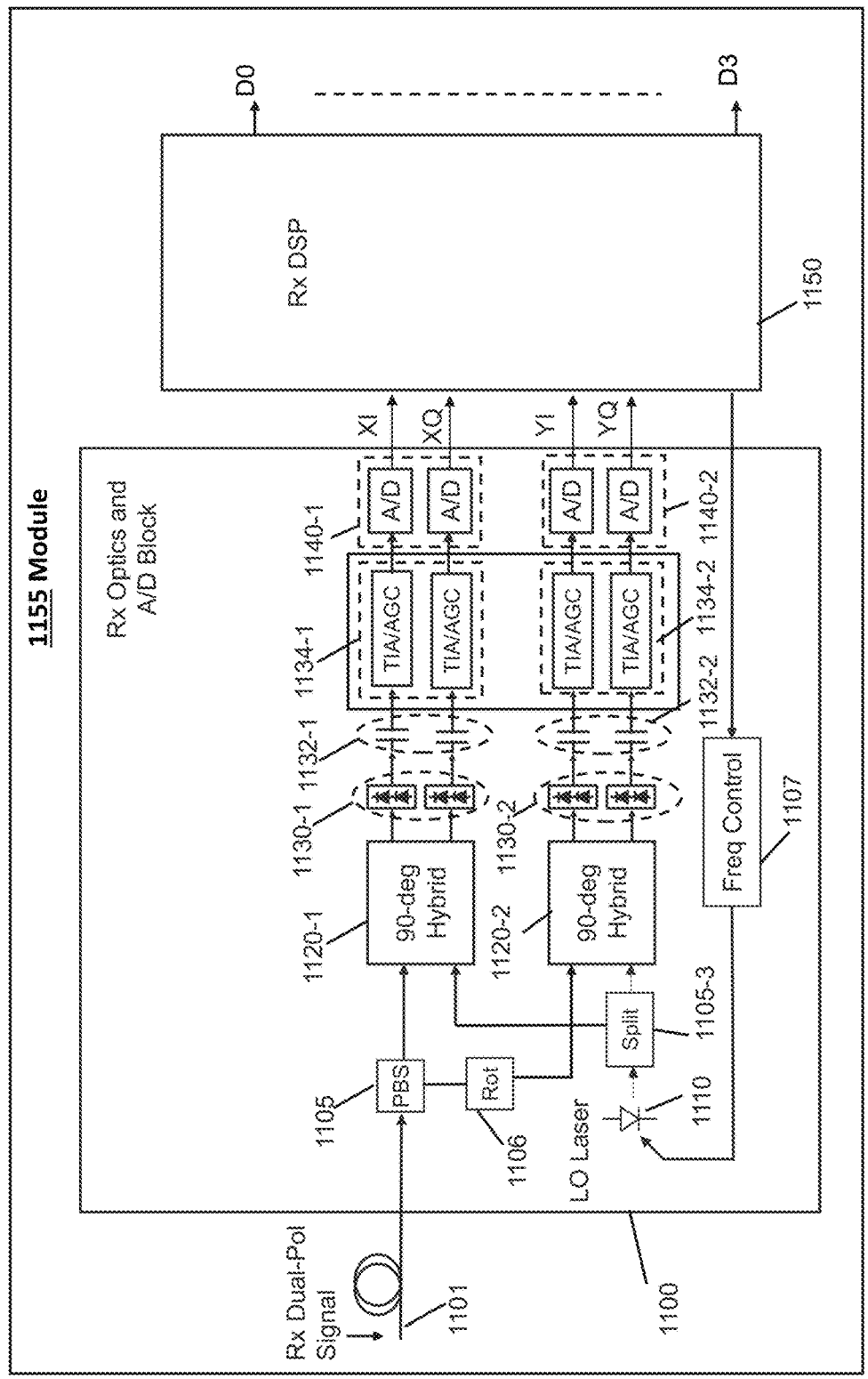
FIG. 11a shows an example of a receiver consistent with an aspect of the present disclosure.

Referring now to FIG. 11a, as shown, optical receiver 1100 of the receiver module 1155 may include receiver (Rx) optics and A/D block 1100, which, in conjunction with Rx DSP 1150, may carry out coherent detection. Block 1100 may include a polarization splitter 1105 with first and second outputs, a local oscillator (LO) laser 1110, 90 degree optical hybrids or mixers 1120-1 and 1120-2 (referred to generally as hybrid mixers 1120 and individually as hybrid mixer 1120), detectors 1130-1 and 1130-2 (referred to generally as detectors 1130 and individually as detector 1130, each including either a single photodiode or balanced photodiode), and AC coupling capacitors 1132-1 and 1132-2.

In one example, one laser may be provided that is "shared" between the transmitter and receiver portions in transceivers 106 and/or transceivers 108. For example, a splitter 999 can provide a first portion of light output from laser 908 to the MZMs 910 in the transmitter portion of the transceiver. Further, the splitter 999 can provide a second portion of such light acting as a local oscillator signal fed to 90 degree optical hybrids 1120 in the receiver portion of the transceiver, as shown in FIG. 9c. In this example, laser 1110 may be omitted.

The block 1100 also includes trans-impedance amplifiers/ automatic gain control circuits 1134 ("TIA/AGC 1134") corresponding to TIA/AGC 1134-1 and 1134-2, analog-to-digital conversion circuitry 1140 ("ADC 1140") corresponding to ADCs 1140-1 and 1140-2, and an Rx DSP 1150. ADCs 1140-1 and 1140-2 may be referred to generally as ADCs 1140 and individually as ADC 1140.

Polarization beam splitter (PBS) 1105 may include a polarization splitter that receives an input polarization multiplexed optical signal including optical subcarriers SC0 to SC8 supplied by optical fiber link 1101, which may be, for example, an optical fiber segment as part of one of optical communication paths of system 100. PBS 1105 may split the incoming optical signal into the two X and Y orthogonal polarization components. The Y component may be supplied to a polarization rotator 1106 that rotates the polarization of the Y component to have the X polarization. Hybrid mixers 1120 may combine the X and rotated Y polarization components with light from local oscillator laser 1110. For example, hybrid mixer 1120-1 may combine a first polarization signal (e.g., the component of the incoming optical signal having a first or X (TE) polarization output from a first port of PBS 1105) with light from local oscillator laser 1110, and hybrid mixer 1120-2 may combine the rotated polarization signal (e.g., the component of the incoming optical signal having a second or Y (TM) polarization output from a second port of PBS 1105) with the light from local oscillator laser 1110.

Detectors 1130 may detect mixing products output from the optical hybrids, to form corresponding voltage signals, which are subject to AC coupling by capacitors 1132-1 and 1132-2, as well as amplification and gain control by TIA/ AGCs 1134-1 and 1134-2. In some implementations, the TIA/AGCs 1134 are used to smooth out or correct variations in the electrical signals output from detector 1130 and AC coupling capacitors 1132. Accordingly, in one example, since the amplitude modulation of the received subcarriers may manifest itself as such variations, the control information associated with such amplitude modulation may be derived based on the magnitude or the amount of correction of such electrical signals. Accordingly, as shown in FIG. 8, line system control data may be output from the TIA/AGC circuits.

As further shown in FIG. 11a, the outputs of TIA/AGCs 1134-1 and 1134-2 are supplied to ADCs 1140, which convert the outputs of the TIA/AGCs, which are analog voltage signals, for example, to digital samples or digital signals. Namely, two detectors or photodiodes 1130-1 may detect the X polarization signals to form the corresponding voltage signals, and a corresponding two ADCs 1140-1 may convert the voltage signals to digital samples associated with the first polarization signals after amplification, gain control and AC coupling. Similarly, two detectors 1130-2 may detect the rotated Y polarization signals to form corresponding voltage signals, and a corresponding two ADCs 1140-2 may convert such voltage signals to digital samples associated with the second polarization signals (Y polarization) after amplification, gain control and AC coupling. Rx DSP 1150 may process the digital samples associated with the X and Y polarization components to output data D0 to D3 associated with subcarriers SC0 to SC3 in the case of subcarriers receive from the one or more secondary nodes. If module 1155 is provided in a secondary node, one or more of data streams D0 to D3 may be output from DSP 1150.

While FIG. 11a shows optical receiver 1100 as including a particular quantity and arrangement of components, in some implementations, optical receiver 1100 may include additional components, fewer components, different components, or differently arranged components. The quantity of detectors 1130 and/or ADCs 1140 may be selected to implement an optical receiver 1100 that is capable of receiving a polarization-multiplexed signal. In some instances, one of the components illustrated in FIG. 11a may carry out a function described herein as being carry outed by another one of the components illustrated in FIG. 11a.

Consistent with the present disclosure, in order to demodulate subcarriers SC0 to SC3, local oscillator laser 1110 may be tuned to output light having a wavelength or frequency relatively close to one or more of the subcarrier wavelengths or frequencies to thereby cause a beating between the local oscillator light and the subcarriers.

In one of the example, the local oscillator laser may be a semiconductor laser, which may be tuned thermally or through current adjustment. If thermally tuned, the temperature of the local oscillator laser 1110 is controlled with a thin film heater, for example, provided adjacent the local oscillator laser. Alternatively, the current supplied to the laser may be controlled, if the local oscillator laser is current tuned. The local oscillator laser 1110 may be a semiconductor laser, such as a distributed feedback laser or a distributed Bragg reflector laser.

Figure 11B:
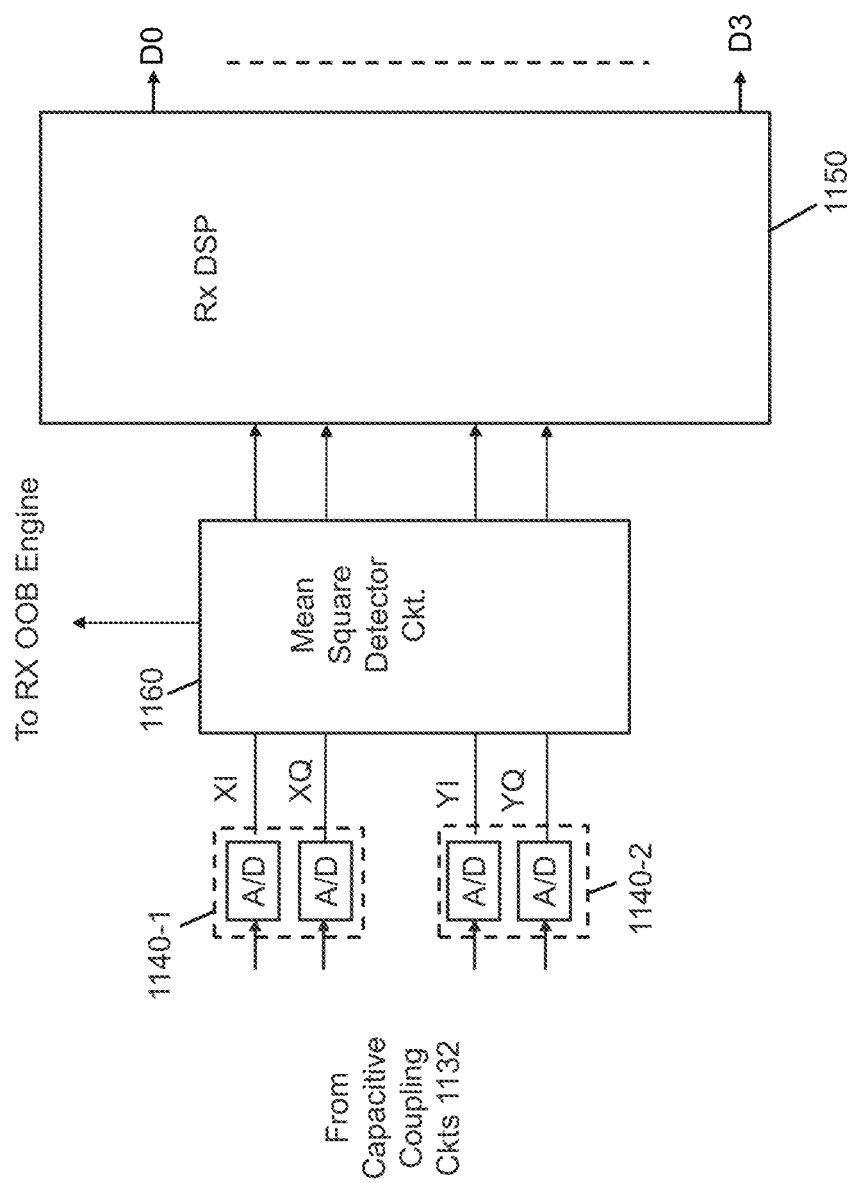

Optionally, control information carried by the above the above-described amplitude modulation may also be detected with a mean square detector ("MSD") circuit 1160 discussed in greater detail with respect to FIG. 11b. For example, the MSD 1160 is coupled to the analog-to-digital conversion circuitry (ADCs 1140) and is operable to receive digital samples received from ADCs 1140 and output such digital samples to RX DSP 1150. MSD circuit 1160 is configured to measure the average power of the received signal. In one example, the average power is calculated by summing the squares of the in-phase and quadrature components of both the X and Y polarizations (average power=$I_X^2+Q_X^2+I_Y^2+Q_Y^2$). In a further example, Ix, Qx, are the outputs of ADCs 1140-1 and Iy, Qy are the outputs of ADCs 1140-2. A low pass filter may be provided if high AM frequencies are employed.

By calculating the average power, as noted above, changes in such average power may also be determined and interpreted as the above-described amplitude modulation. Convention processing of such amplitude modulation, optionally within the MDS circuit 1160, may be employed to provide the control data associated with such amplitude modulation ("LD Data" in FIG. 11b).

In order to supply control information based on the outputs from either TIA/AGC circuits 1134 or mean square detector 1160, the outputs from either circuit may be provided to a bandpass filter (BPF), for example, which passes frequency components corresponding to the amplitude modulation frequency associated with control information. The filtered output from the BPF may next supplied to clock and data recovery circuit, which extracts the control information from the filtered output in a known manner.

As noted above, both X and Y polarization components of each optical subcarrier are amplitude modulated. The BPF and associated circuitry may be provide to extract control information from both the X and Y polarization components, for example, to improve accuracy of the detected control information.

Returning to FIG. 11*b*, Rx DSP 1150 processes the digital samples supplied thereto to provide user data streams D0 to D3 or some subset thereof at the secondary nodes, which were input to the Tx DSP 902, as noted above. In one example, the ADCs and Mean Square Detector can be part of DSP or on the same die or chip.

Figure 12:
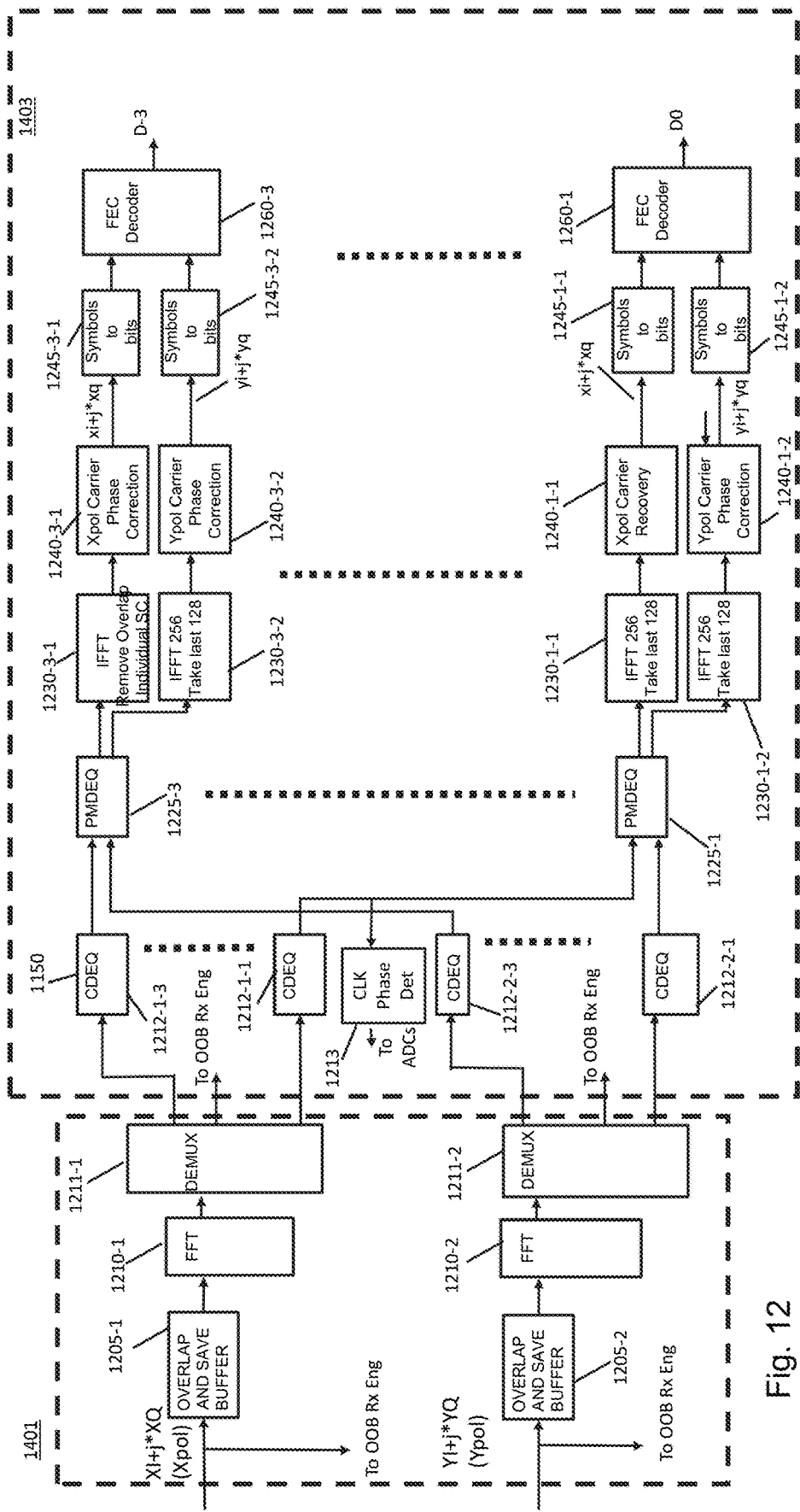

Rx DSP 1150 is discussed in greater detail below with respect to FIG. 12. FIG. 12 shows DSP 1150 including blocks 1401 and 1403, both of which are shown in detail in FIG. 12. As noted above, analog-to-digital (A/D) circuits 1140-1 and 1140-2 output digital samples corresponding to the analog inputs supplied thereto. In one example, the samples may be supplied by each A/D circuit at a rate of 64 G Sample/s. The digital samples correspond to symbols carried by the X polarization the optical subcarriers and may be represented by the complex number XI+jXQ. The digital samples may be provided to a buffer or memory circuit, such as overlap and save buffers 1205-1 and 1205-2, as inputs to Rx DSP block 1401. In addition, both X and Y digital samples may be provided to an OOB Rx engine described below for extracting control information from OOB-AM1-SC and OOB-AM3-SC. FFT component or circuit 1210-1, also included in block 1401, may receive the 2048 vector elements, for example, from the overlap and save buffer 1005-1 and convert the vector elements to the frequency domain using, for example, a fast Fourier transform (FFT). The FFT component 1210-1 may convert the 2048 vector elements to 2048 frequency components, each of which may be stored in a register or "bin" or other memory, as a result of carry outing the FFT.

The frequency components may then then be demultiplexed, and groups of such components may be supplied to a respective one of chromatic dispersion equalizer circuits CDEQ 1212-1-0 to 1212-1-3 as inputs to block 1403. Some of the outputs of demultiplexer 1211-1 and 1211-2 may be provide to the OOB Rx engine for extracting control information from OOB-SC3-CW. Alternatively, subcarriers or carriers at frequencies A, B, C, C, and E discussed above in connection with 7A-7D may also be detected. Each of the CDEQ circuits may include a finite impulse response (FIR) filter that corrects, offsets or reduces the effects of, or errors associated with chromatic dispersion of the transmitted optical subcarriers. Each of CDEQ circuits 1212-1-0 to 1212-1-3 supplies an output to a corresponding polarization mode dispersion (PMD) equalizer circuit 1225-0 to 1225-3.

It is noted that digital samples output from A/D circuits 1140-2 associated with Y polarization components of subcarrier SC1 may be processed in a similar manner to that of digital samples output from A/D circuits 1140-1 and associated with the X polarization component of each subcarrier. Namely, overlap and save buffer 1205-2, FFT 1210-2 and CDEQ circuits 1212-2-0 to 1212-2-3 may have a similar structure and operate in a similar fashion as buffer 1205-1, FFT 1210-1 and CDEQ circuits 1212-1-0 to 1212-1-3, respectively. For example, each of CDEQ circuits 1212-2-0 to 1212-3 may include an FIR filter that corrects, offsets, or reduces the effects of, or errors associated with chromatic dispersion of the transmitted optical subcarriers. In addition, each of CDEQ circuits 1212-2-0 to 1212-2-3 provide an output to a corresponding one of PMDEQ 1225-0 to 1225-3.

As further shown in FIG. 12, the output of one of the CDEQ circuits, such as CDEQ 1212-1-0 may be supplied to clock phase detector circuit 1213 to determine a clock phase or clock timing associated with the received subcarriers. Such phase or timing information or data may be supplied to ADCs 1140-1 and 1140-2 to adjust or control the timing of the digital samples output from ADCs 1140-1 and 1140-2.

Each of PMDEQ circuits 1225 may include another FIR filter that corrects, offsets or reduces the effects of, or errors associated with PMD of the transmitted optical subcarriers. Each of PMDEQ circuits 1225 may supply a first output to a respective one of IFFT components or circuits 1230-0-1 to 1230-3-1 and a second output to a respective one of IFFT components or circuits 1230-0-2 to 1230-3-2, each of which may convert a 256 element vector, in this example, back to the time domain as 256 samples in accordance with, for example, an inverse fast Fourier transform (IFFT).

Time domain signals or data output from IFFT 1230-0-1 to 1230-3-1 are supplied to a corresponding one of Xpol carrier phase correction circuits 1240-1-1 to 1240-3-1, which may apply carrier recovery techniques to compensate for X polarization transmitter (e.g., laser 908) and receiver (e.g., local oscillator laser 1110) linewidths. In some implementations, each carrier phase correction circuit 1240-1-1 to 1240-3-1 may compensate or correct for frequency and/or phase differences between the X polarization of the transmit signal and the X polarization of light from the local oscillator 1110 based on an output of Xpol carrier recovery circuit 1240-0-1, which performs carrier recovery in connection with one of the subcarrier based on the outputs of IFFT 1230-01. After such X polarization carrier phase correction, the data associated with the X polarization component may be represented as symbols having the complex representation xi+j*xq in a constellation, such as a QPSK constellation or a constellation associated with another modulation formation, such as an m-quadrature amplitude modulation (QAM), m being an integer. In some implementations, the taps of the FIR filter included in one or more of PMDEQ circuits 1225 may be updated based on the output of at least one of carrier phase correction circuits 1240-0-1 to 1240-3-01.

In a similar manner, time domain signals or data output from IFFT 1230-0-2 to 1230-3-2 are supplied to a corresponding one of Ypol carrier phase correction circuits 1240-0-2 to 1240-3-2, which may compensate or correct for Y polarization transmitter (e.g., laser 908) and receiver (e.g., local oscillator laser 1110) linewidths. In some implementations, each carrier phase correction circuit 1240-0-2 to 1240-3-2 may also corrector or compensate or correct for frequency and/or phase differences between the Y polarization of the transmit signal and the Y polarization of light from the local oscillator laser 1110. After such Y polarization carrier phase correction, the data associated with the Y polarization component may be represented as symbols having the complex representation yi+j*yq in a constellation, such as a QPSK constellation or a constellation associated with another modulation formation, such as an m-quadrature amplitude modulation (QAM), m being an integer. In some implementations, the output of one of circuits 1240-0-2 to 1240-3-2 may be used to update the taps of the FIR filter included in one or more of PMDEQ circuits 1225 instead of or in addition to the output of at least one of the carrier recovery circuits 1240-0-1 to 1240-3-1.

As further shown in FIG. 12, the output of carrier recovery circuits, e.g., carrier recovery circuit 1240-0-1, may also be supplied to carrier phase correction circuits 1240-1-1 to 1240-3-1 and 1240-0-2 to 1240-3-2 whereby the phase correction circuits may determine or calculate a corrected carrier phase associated with each of the received subcarriers based on one of the recovered carriers, instead of providing multiple carrier recovery circuits, each of which being associated with a corresponding subcarrier.

Each of the symbols to bits circuits or components 1245-0-1 to 1245-3-1 may receive the symbols output from a corresponding one of circuits 1240-0-1 to 1240-3-1 and map the symbols back to bits. For example, each of the symbol to bits components 1245-0-1 to 1245-3-1 may map one X polarization symbol, in a QPSK or m-QAM constellation, to Z bits, where Z is an integer. For dual-polarization QPSK modulated subcarriers, Z is four. Bits output from each of component 1245-0-1 to 1245-3-1 are provided to a corresponding one of FEC decoder circuits 1260-0 to 1260-3.

Y polarization symbols are output form a respective one of circuits 1240-0-2 to 1240-3-2, each of which having the complex representation yi+j*yq associated with data carried by the Y polarization component. Each Y polarization, like the X polarization symbols noted above, may be provided to symbols to a corresponding one of bit to symbol circuits or components 1245-0-2 to 1245-3-2, each of which having a similar structure and operating a similar manner as symbols to bits component 1245-0-1 to 1245-3-1. Each of circuits 1245-0-2 to 1245-3-2 may provide an output to a corresponding one of FEC decoder circuits 1260-0 to 1260-3.

Each of FEC decoder circuits 1260 may remove errors in the outputs of symbol to bit circuits 1245 using forward error correction. Such error corrected bits, which may include user data for output to or output from secondary node 108, may be supplied as a corresponding one of outputs D0 to D8 from block 1403.

While FIG. 12 show Rx DSP 1150 as including a particular quantity and arrangement of functional components, in some implementations, DSP 1150 may include additional functional components, fewer functional components, different functional components, or differently arranged functional components.

Figure 13:
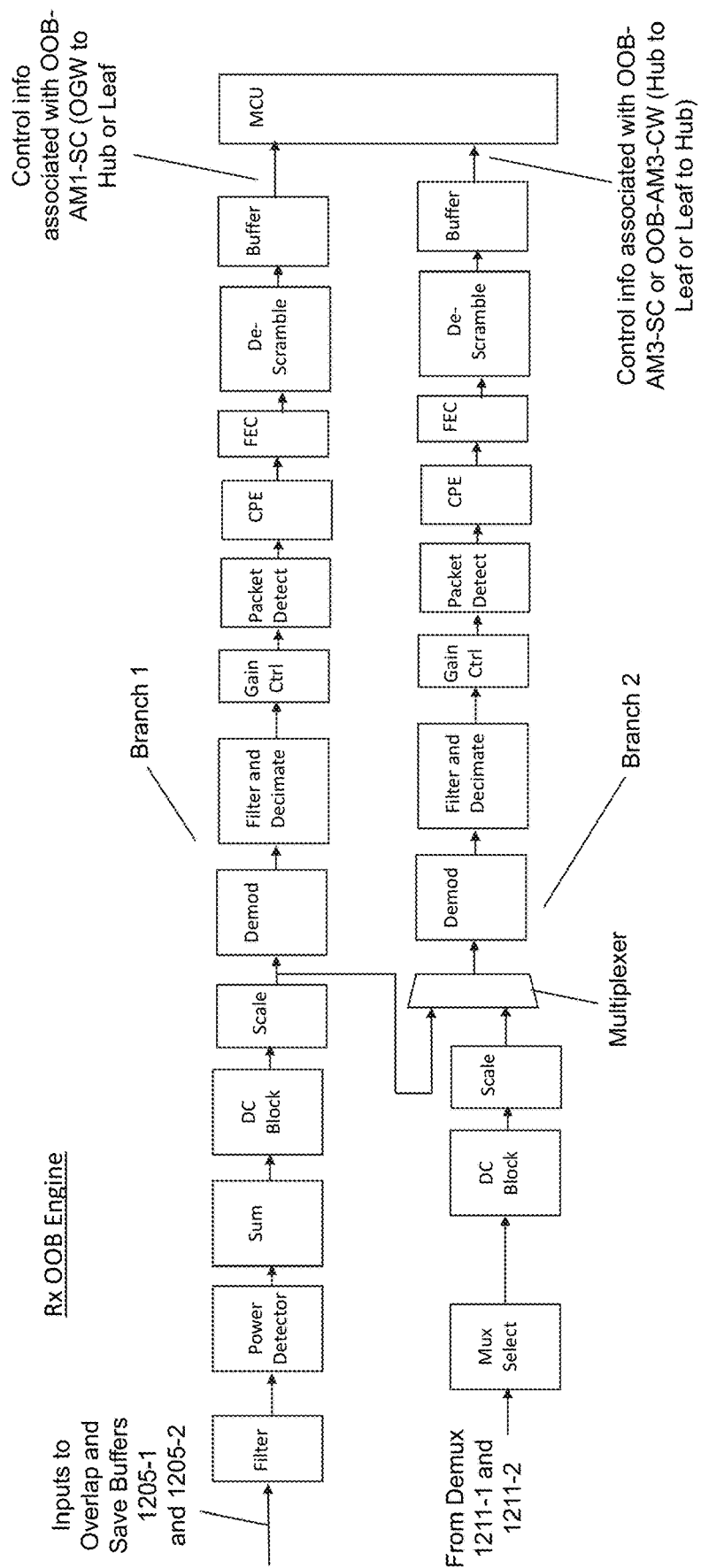

FIG. 13 shows an example an RX OOB engine consistent with the present disclosure. As shown in FIG. 13, input to overlap and save buffers 1205-1 and 1205-2 are input to a filter, such as a low-pass filter, which is provided to limit the number of sub-carriers that are used for the AM demodulation, e.g., OOB-AM1-SC. The sign of each tributary (XI,XQ,YI,YQ) is removed and the data is output from filter to a power detector, as described above, and input top a summer circuit, which sums the data over a predetermined number of clock cycles. The summing effectively constitutes a filtering and decimation such that the following blocks can run at a lower rate, and dissipate less power.

The summer circuit provides the resulting sum to a DC block circuit that removes the DC component. The resulting data is next fed to a scaling circuit, which scales the data whereby the bus width reduced. The data is then supplied to a demodulating circuit of Branch 1, and the demodulated data is fed to a low pass filter and decimating circuit, which low-pass filters the data (using a moving average cascaded integrator comb (CIC) filter) and decimated to 32 samples/symbol. Clock gapping/enabling is used for the decimation so that the OOB data-rate is at a desired rate.

The output of the filter and decimating block is fed to a gain control circuit, which normalizes the data scaling. The output of the gain control circuit is provided to a packet detector, which detects the packet header. The packet header and associated data is next provided to a carrier phase estimate (CPE) circuit that selects the correct sampling phase and, outputs the packet data at 1 sample/symbol.

The packet message is then stored for packet processing. The carrier phase offset caused by a clock frequency offset is removed by the CPE. A hard-decision FEC decoder can be used to correct for bit errors, and the decoded data is provided to a descrambler circuit, which, in turn, provides the descrambled data to a buffer. The buffer outputs the control information or data associated with OOB-AM1-SC to microcontroller MCU for further processing.

In order to provide data based on OOB-AM3-CW, a mux select circuit is provided to selectively supply the input from demux 1211-1 and 1211-2. Namely, as noted above, the secondary node receiver will not receive the OOB-AM3-SC signal at the same as the OOB-AM3-CW signal. Accordingly, circuitry in branch branch 2 may be used to provides both OOB-AM3-SC and OOB-AM3-CW associated data. That is, when OOB-AM1-SC is received processing is carried out by the blocks in branch 1 based on outputs of overlap and save buffers 1205-1 and 1205-2. If OOB-AM3-SC is received, processing is carried out by the filter, power detector summer, DC block and scaling circuits of branch 1, but the output of the scaling circuit is provided to a multiplexer, which provides an output that is processed by demod, filter/decimate, gain control, packet detector, CPE, FEC, descramble, and buffer blocks in branch 2 to provide an output to microcontroller MCU. If OOB-AM3-CW is received, the output of demultiplexer 1211-1 and 1211-2 are provided to mux-select block, which selectively supplies such data to a DC blocking circuit in branch 2 similar to the DC blocking circuit of branch 1. The output of the DC blocking circuit is provided to a scaling circuit similar to that described above and the output thereof is fed to the multiplexer which supplies an output that is processed in a similar manner as when the output of the multiplexer provides an outputs associated with OOB-AM3-SC.

Thus, the demodulation and packet processing are instantiated twice, once for the OOB3-AM-SC channel, and once for the OOB1-AM-SC channel.

The gain control circuit is preferably provided in the receiver to accommodate bursty packets with varying powers. The packets have a preamble that is sufficiently long for the gain control to converge. It consists of a power measurement circuit, averaging filter (e.g. IIR) and x/sqrt look-up table to obtain the desired signal scaling.

The packet detector is used to determine when a new packet has arrived, and to select the correct sampling instance to down-sample from (in this embodiment) a given number of sample samples/symbol to 1 sample/symbol, for example. It works by locating the frame alignment sequence. The circuit may perform:

Differential decoding to remove the phase offset and frequency offset

Correlation against the known frame alignment sequence (here a differentially encoded Gold code) which has good auto-correlation properties.

A Hard-Decision based correlation is used to determine whether the frame header is present.

A Soft-Decision based correlation is used thereafter to determine the best sampling instance.

Once the frame alignment sequence has been found, a search over the next n samples is performed to determine which sample has the best correlation. This indicates the best sampling instance/offset. This sampling offset is used to downsample the packet to 1 sample/symbol from the given number (n) of samples/symbol by thereafter selecting every nth sample.

Clock offsets and frequency inaccuracies may cause a residual phase error which may vary throughout the packet. A carrier phase estimator is necessary to remove the phase error and can at the same time provide hard-decisions, giving the 0/1 message data bits at the output. Although there are many variants of carrier phase estimators, this implementation uses a simple 1st order phase lock loop PLL where the error angle is average over 8 consecutive symbols, and used to provide an estimate for the next incoming symbol.

The CPE exhibits a pi phase ambiguity meaning that the unknown starting phase of the data can lead to the output bits being inverted. In addition, averaging within the CPE may result in the first X symbols being unreliable. Y additional symbols may be used as a known reference to provide a reliable estimate of the initial phase. If the majority of these symbols are found to be inverted, the data packet is inverted. Therefore, the CPE uses the last Z symbols of header along with additional symbols for payload+FEC from packet detector. In one example, only the payload+FEC are required after the CPE block.

Various aspects of the disclosure and the functional operations described in this specification may be implemented in digital electronic circuitry, or in computer software, firmware, or hardware, including the structures disclosed in this specification and their structural equivalents, or in combinations of one or more of them. Likewise, various aspects of the disclosure may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

In some instances, various processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

Although a few implementations have been described in detail above, other modifications are possible. For example, the logic flows depicted in the figures do not necessarily require the particular order shown, or sequential order, to achieve desirable results. In addition, other actions may be provided, or actions may be eliminated, from the described flows, and other components may be added to, or removed from, the described systems.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In some cases, various features described in connection with different embodiments may be combined in the same implementation. Further, as the foregoing implementations are intended as examples, various features may be omitted in some cases, and/or additional features may be present in some cases.

Thus, although particular examples of the subject matter have been described, other implementations are within the scope of the claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An apparatus, comprising:
a laser operable to supply an optical signal; a digital signal processor operable to supply digital signals;
digital to analog circuitry operable to provide analog signals based on the digital signals;
driver circuitry coupled to the digital to analog circuitry, the driver circuitry operable to supply at least one drive signal; and
a modulator operable to:
receive said at least one drive signal,
modulate the optical signal supplied from the laser based on said at least one drive signal to provide a plurality of optical subcarriers, each of the plurality of optical subcarriers having a corresponding one of a plurality of frequencies,
amplitude modulate the plurality of optical subcarriers at a first frequency to carry control information, the control information including packets that include information identifying a recipient node of user data, and
modulate each of the plurality of subcarriers at a second frequency to carry respective user data at a second frequency greater than the first frequency.

2. An apparatus in accordance with claim 1, wherein each of the optical subcarriers is a Nyquist subcarrier.

3. An apparatus in accordance with claim 1, wherein the control information includes OAM&P information.

4. An apparatus in accordance with claim 1, wherein the plurality of optical subcarriers is a first plurality of optical subcarriers, the apparatus further including a receiver operable to receive a second plurality of optical subcarriers, each of which is amplitude modulated at a third frequency different than the first frequency and the second frequency.

5. An apparatus in accordance with claim 4, wherein the first frequency is within a first band and the third frequency is within a second band.

6. An apparatus in accordance with 1, wherein the packet includes a preamble, a header, and a payload.

7. An apparatus in accordance with claim 6, wherein the packet further includes a postamble.

8. An apparatus in accordance with claim 1, wherein the modulator includes a Mach-Zehnder modulator.

9. An apparatus in accordance with claim 1, wherein each of the plurality of optical subcarriers includes a first polarization component and a second polarization component.

10. An apparatus in accordance with claim 1, wherein the modulator is further operable to collectively amplitude modulate the plurality of optical subcarriers at the first frequency to carry the control information.

11. An apparatus in accordance with claim 1, wherein the control information is first control information, the plurality of optical subcarriers is a plurality of first optical subcarriers, and the plurality of frequencies is a plurality of first frequencies, the modulator further being operable to supply a second optical subcarrier having a second frequency that is greater than each of the plurality of first frequencies, the second optical subcarrier carrying second control information.

12. An apparatus in accordance with claim 1, wherein the control information is first control information, the plurality of optical subcarriers is a plurality of first optical subcarriers, and the plurality of frequencies is a plurality of first frequencies, the modulator further being operable to supply a second optical subcarrier having a second frequency that is less than each of the plurality of first frequencies, the second optical subcarrier carrying second control information.

13. An apparatus in accordance with claim 1, wherein the control information is first control information, the plurality of optical subcarriers is a plurality of first optical subcarriers, and the plurality of frequencies is a plurality of first frequencies, the modulator further being operable to supply: a second optical subcarrier having a second frequency that is greater than each of the plurality of first frequencies, the second optical subcarrier carrying second control information; and a third optical subcarrier having a third frequency that is less than each of the plurality of first frequencies, the third optical subcarrier carrying third control information.

14. An apparatus in accordance with claim 1, wherein the digital signal processor includes a plurality of gain circuits, each of which having an associated one of a plurality of gains, each of the digital signals being indicative of a corresponding one of the plurality of gains.

15. An apparatus in accordance with claim 1, wherein the apparatus includes a transceiver, wherein the plurality of subcarriers is a first plurality of subcarriers, the transceiver including a receiver operable to receive a second plurality of subcarriers.

16. An apparatus in accordance with claim 1, wherein the first frequency is in a range of 3 MHz to 4 MHz.

* * * * *